(12) United States Patent
Haramaty et al.

(10) Patent No.: US 10,838,711 B2
(45) Date of Patent: Nov. 17, 2020

(54) IN-SERVICE SOFTWARE/FIRMWARE UPDATE

(71) Applicant: MELLANOX TECHNOLOGIES TLV LTD., Raanana (IL)

(72) Inventors: Zachy Haramaty, Hemed (IL); Gal Shohet, Yavne (IL); Elan Rohekar, Kfar Saba (IL); Maty Golovaty, Ashdod (IL); Matty Kadosh, Hadera (IL); Tom Munk, Petah-Tikva (IL); Oded Nadir, Kibbutz Ramat Hashofet (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/574,118

(22) Filed: Sep. 18, 2019

(65) Prior Publication Data
US 2020/0097281 A1 Mar. 26, 2020

Related U.S. Application Data

(60) Provisional application No. 62/733,671, filed on Sep. 20, 2018.

(51) Int. Cl.
*G06F 8/656* (2018.01)
*G06F 8/658* (2018.01)
*G06F 8/65* (2018.01)

(52) U.S. Cl.
CPC .............. *G06F 8/656* (2018.02); *G06F 8/65* (2013.01); *G06F 8/658* (2018.02)

(58) Field of Classification Search
None
See application file for complete search history.

(56) References Cited

U.S. PATENT DOCUMENTS

| | | |
|---|---|---|
| 6,070,012 A | 5/2000 | Eitner et al. |
| 6,397,385 B1 | 5/2002 | Kravitz |
| 6,535,924 B1 | 3/2003 | Kwok et al. |
| (Continued) | | |

OTHER PUBLICATIONS

Brocade, "Network OS 7.0.1 for Brocade VDX", Release Notes v4.0, pp. 1-199, Aug. 24, 2016.
Wikipedia, "Firmware", pp. 1-6, Jul. 23, 2019.

*Primary Examiner* — Qing Chen
(74) *Attorney, Agent, or Firm* — Kligler & Associates Patent Attorneys Ltd

(57) ABSTRACT

A method including altering the configuration of a system including a processor, firmware storage and a scratchpad from a first configuration in which a first version of firmware enabling a first plurality of system operations is run by the processor, into a second configuration in which a second version of firmware enabling a second plurality of system operations is run by the processor, the altering including: A) re-configuring the system from the first configuration into an intermediate configuration in which the processor continues to run the first version of the firmware, B) while the system is in the intermediate configuration, disallowing at least one of the first plurality of operations, C) re-configuring the system from the intermediate configuration to the second configuration, and D) while the system is in the second configuration, allowing the second plurality of operations. Related apparatus and methods are also provided.

18 Claims, 17 Drawing Sheets

(56) References Cited

U.S. PATENT DOCUMENTS

| | | | |
|---|---|---|---|
| 6,640,334 B1 * | 10/2003 | Rasmussen | G06F 8/65 |
| | | | 717/169 |
| 7,609,617 B2 | 10/2009 | Appanna et al. | |
| 7,661,025 B2 | 2/2010 | Banks et al. | |
| 8,190,720 B1 | 5/2012 | Yellai et al. | |
| 8,194,642 B2 | 6/2012 | Rosenberg et al. | |
| 8,219,794 B1 * | 7/2012 | Wang | G06F 3/0607 |
| | | | 713/2 |
| 8,346,913 B2 | 1/2013 | Gao et al. | |
| 8,402,453 B2 | 3/2013 | Gupta et al. | |
| 8,745,614 B2 | 6/2014 | Banerjee et al. | |
| 8,782,632 B1 | 7/2014 | Chigurapati et al. | |
| 9,088,584 B2 | 7/2015 | Feng et al. | |
| 9,182,972 B2 | 11/2015 | Hanselmann | |
| 9,870,219 B1 | 1/2018 | Manthiramoorthy et al. | |
| 10,452,386 B1 * | 10/2019 | Kulchytskyy | G06F 8/654 |
| 2002/0092008 A1 * | 7/2002 | Kehne | G06F 8/65 |
| | | | 717/168 |
| 2004/0083476 A1 | 4/2004 | Zhou et al. | |
| 2005/0114846 A1 | 5/2005 | Banks et al. | |
| 2006/0233182 A1 * | 10/2006 | Appanna | H04L 45/586 |
| | | | 370/401 |
| 2007/0174685 A1 * | 7/2007 | Banks | G06F 11/2097 |
| | | | 714/12 |
| 2008/0126541 A1 * | 5/2008 | Rosenberg | H04L 65/1016 |
| | | | 709/225 |
| 2008/0195693 A1 * | 8/2008 | Gao | G06F 8/65 |
| | | | 709/202 |
| 2009/0089774 A1 | 4/2009 | Lynch et al. | |
| 2010/0199272 A1 | 8/2010 | Mahajan et al. | |
| 2012/0072893 A1 * | 3/2012 | Gupta | G06F 9/445 |
| | | | 717/168 |
| 2012/0291021 A1 * | 11/2012 | Banerjee | G06F 8/654 |
| | | | 717/173 |
| 2013/0145359 A1 * | 6/2013 | Hanselmann | G06F 8/65 |
| | | | 717/173 |
| 2013/0155902 A1 * | 6/2013 | Feng | G06F 11/203 |
| | | | 370/255 |
| 2014/0189673 A1 | 7/2014 | Stenfort et al. | |
| 2016/0266894 A1 | 9/2016 | Panicker et al. | |
| 2017/0168803 A1 | 6/2017 | Katyar et al. | |

* cited by examiner

500 — 510

ALTER THE CONFIGURATION OF A SYSTEM INCLUDING A PROCESSOR, FIRMWARE STORAGE AND AN ON-SYSTEM HARDWARE SCRATCHPAD FROM A FIRST CONFIGURATION IN WHICH THE FIRMWARE STORAGE STORES A FIRST VERSION OF FIRMWARE RUN BY THE PROCESSOR, INTO A SECOND CONFIGURATION IN WHICH THE FIRMWARE STORAGE STORES A SECOND VERSION OF FIRMWARE RUN BY THE PROCESSOR, THE FIRST VERSION OF THE FIRMWARE ENABLING THE SYSTEM TO CARRY OUT A FIRST PLURALITY OF OPERATIONS AND THE SECOND VERSION OF THE FIRMWARE ENABLING THE SYSTEM TO CARRY OUT A SECOND PLURALITY OF OPERATIONS, THE FIRST PLURALITY OF OPERATIONS AND THE SECOND PLURALITY OF OPERATIONS NOT BEING IDENTICAL, INCLUDING:

520

A) RE-CONFIGURING THE SYSTEM FROM THE FIRST CONFIGURATION INTO AN INTERMEDIATE CONFIGURATION IN WHICH THE PROCESSOR CONTINUES TO RUN THE FIRST VERSION OF FIRMWARE

530

B) WHILE THE SYSTEM IS IN THE INTERMEDIATE CONFIGURATION, DISALLOWING AT LEAST ONE OF THE FIRST PLURALITY OF OPERATIONS

540

C) RE-CONFIGURING THE SYSTEM FROM THE INTERMEDIATE CONFIGURATION TO THE SECOND CONFIGURATION

550

D) WHILE THE SYSTEM IS IN THE SECOND CONFIGURATION, ALLOWING THE SECOND PLURALITY OF OPERATIONS

FIG. 5

IN-SERVICE SOFTWARE/FIRMWARE UPDATE

FIELD OF THE INVENTION

The present invention, in exemplary embodiments thereof, relates to software update/upgrade, and particularly but not exclusively to in-service update/upgrade of software and/or firmware.

BACKGROUND OF THE INVENTION

In-service update refers in general to methods and techniques for updating/upgrading software without taking a device on which the software runs offline during the software update. Throughout the present specification and claims, the term "upgrade", in all its grammatical forms, includes the term "downgrade".

SUMMARY OF THE INVENTION

The present invention, in certain embodiments thereof, seeks to provide an improved method and system for in-service update and/or upgrade of software; in certain exemplary embodiments, such improved in-service update and/or upgrade may relate specifically to firmware.

There is thus provided in accordance with an exemplary embodiment of the present invention a system including a processor, firmware storage, and an on-system hardware scratchpad, the processor being adapted to alter the configuration of the system from a first configuration in which the firmware storage stores a first version of firmware run by the processor, into a second configuration in which the firmware storage stores a second version of firmware run by the processor, the first version of the firmware enabling the system to carry out a first plurality of operations and the second version of the firmware enabling the system to carry out a second plurality of operations, the first plurality of operations and the second plurality of operations not being identical, the altering including: A) re-configuring the system from the first configuration into an intermediate configuration in which the processor continues to run the first version of the firmware, B) while the system is in the intermediate configuration, disallowing at least one of the first plurality of operations, C) re-configuring the system from the intermediate configuration to the second configuration, and D) while the system is in the second configuration, allowing the second plurality of operations.

Further in accordance with an exemplary embodiment of the present invention at least one of the first plurality of operations includes an operation that is run at system reset and is not run while the system is in the intermediate configuration or in the second configuration.

Still further in accordance with an exemplary embodiment of the present invention at least one of the second plurality of operations includes an operation that is run at system reset and is not run while the system is in the second configuration.

Additionally in accordance with an exemplary embodiment of the present invention the processor is also adapted to load the second version of the firmware into the firmware storage.

Moreover in accordance with an exemplary embodiment of the present invention the first version of the firmware and the second version of the firmware are simultaneously stored in the firmware storage, and the re-configuring the system from the intermediate configuration to the second configuration includes ceasing to run the first version of the firmware and activating the second version of the firmware for running by the processor.

Further in accordance with an exemplary embodiment of the present invention the on-system hardware scratchpad stores at least one parameter used by the processor.

Still further in accordance with an exemplary embodiment of the present invention the re-configuring the system from the intermediate configuration to the second configuration includes activating the second firmware version for running by the processor.

Additionally in accordance with an exemplary embodiment of the present invention the first configuration is associated with the first version of firmware which is stored in the firmware storage and is in an active state when the system is in the first configuration, and the second configuration is associated with the second firmware version which is stored in the firmware store and is in an active state when the system is in the second configuration.

Moreover in accordance with an exemplary embodiment of the present invention while the system is in in the first configuration, the system has a first set of states, while the system is in the second configuration, the system has a second set of states, the first set of states and the second set of states not being identical, while the system is in the intermediate configuration, the system has an intermediate set of states, the intermediate set of states including a subset of the first set of states and a subset of the second set of states, the disallowing at least some of the first plurality of operations while the system is in the intermediate configuration includes disallowing system transition between any one state of the intermediate set of states and any other state of the intermediate set of states, and the allowing the second plurality of operations while the system is in the second configuration includes allowing system transition between at least a first state of the second set of states and at least a second state of the second set of states.

Further in accordance with an exemplary embodiment of the present invention A also includes quiescing the system from the first configuration to the intermediate configuration, the quiescing including disallowing transitions from any state included in the intermediate set of states to any state not included in the intermediate set of states.

Still further in accordance with an exemplary embodiment of the present invention the quiescing also includes forcing the system from a state not included in the intermediate set of states to a state included in the intermediate set of states.

Additionally in accordance with an exemplary embodiment of the present invention while the system is in the first configuration, the system uses a first set of address locations in the on-system hardware scratchpad, while the system is in the second configuration, the system uses a second set of address locations in the on-system hardware scratchpad, and in at least one of the intermediate configuration and the second configuration, the system transitions data from the first set of address locations in the on-system hardware scratchpad to the second set of address locations in the on-system hardware scratchpad, and upon completing transitioning data from the first set of address locations in the on-system hardware scratchpad to the second set of address locations in the on-system hardware scratchpad, the system continues to operate in the second configuration.

Moreover in accordance with an exemplary embodiment of the present invention while the system is in the first configuration, the processor operates with a first system parameter stored in the on-system hardware scratchpad, the first system parameter having a value determined dynamically by the processor in accordance with the first version of firmware, while the system is in the intermediate configuration, the processor operates with the first system parameter having a static value, and while the system is in the second configuration, the processor operates with the first system parameter having a value determined dynamically by the processor in accordance with the second version of firmware.

Further in accordance with an exemplary embodiment of the present invention the first system parameter includes fan speed.

There is also provided in accordance with another exemplary embodiment of the present invention a method including altering the configuration of a system including a processor, firmware storage and an on-system hardware scratchpad from a first configuration in which the firmware storage stores a first version of firmware run by the processor, into a second configuration in which the firmware storage stores a second version of firmware run by the processor, the first version of the firmware enabling the system to carry out a first plurality of operations and the second version of the firmware enabling the system to carry out a second plurality of operations, the first plurality of operations and the second plurality of operations not being identical, the altering including: A) re-configuring the system from the first configuration into an intermediate configuration in which the processor continues to run the first version of the firmware, B) while the system is in the intermediate configuration, disallowing at least one of the first plurality of operations, C) re-configuring the system from the intermediate configuration to the second configuration, and D) while the system is in the second configuration, allowing the second plurality of operations.

Further in accordance with an exemplary embodiment of the present invention while the system is in in the first configuration, the system has a first set of states, while the system is in the second configuration, the system has a second set of states, the first set of states and the second set of states not being identical, while the system is in the intermediate configuration, the system has an intermediate set of states, the intermediate set of states including a subset of the first set of states and a subset of the second set of states, the disallowing at least some of the first plurality of operations while the system is in the intermediate configuration includes disallowing system transition between any one state of the intermediate set of states and any other state of the intermediate set of states, and the allowing the second plurality of operations while the system is in the second configuration includes allowing system transition between at least a first state of the second set of states and at least a second state of the second set of states.

Still further in accordance with an exemplary embodiment of the present invention step A also includes quiescing the system from the first configuration to the intermediate configuration, the quiescing including disallowing transitions from any state included in the intermediate set of states to any state not included in the intermediate set of states.

Further in accordance with an exemplary embodiment of the present invention the quiescing also includes forcing the system from a state not included in the intermediate set of states to a state included in the intermediate set of states.

Additionally in accordance with an exemplary embodiment of the present invention while the system is in the first configuration, the system uses a first set of address locations in the on-system hardware scratchpad, while the system is in the second configuration, the system uses a second set of address locations in the on-system hardware scratchpad, and in at least one of the intermediate configuration and the second configuration, the system transitions data from the first set of address locations in the on-system hardware scratchpad to the second set of address locations in the on-system hardware scratchpad, and upon completing transitioning data from the first set of address locations in the on-system hardware scratchpad to the second set of address locations in the on-system hardware scratchpad, the system continues to operate in the second configuration.

Moreover in accordance with an exemplary embodiment of the present invention while the system is in the first configuration, the processor operates with a first system parameter stored in the on-system hardware scratchpad, the first system parameter having a value determined dynamically by the processor in accordance with the first version of firmware, while the system is in the intermediate configuration, the processor operates with the first system parameter having a static value, and while the system is in the second configuration, the processor operates with the first system parameter having a value determined dynamically by the processor in accordance with the second version of firmware.

BRIEF DESCRIPTION OF THE DRAWINGS

The present invention will be understood and appreciated more fully from the following detailed description, taken in conjunction with the drawings in which:

FIG. 5-9 are simplified block diagram illustrations of various exemplary methods of operation of the system of FIGS. 1A-1C and of the exemplary embodiments of FIGS. 2A-4C.

DETAILED DESCRIPTION OF AN EMBODIMENT

Figure 1A:
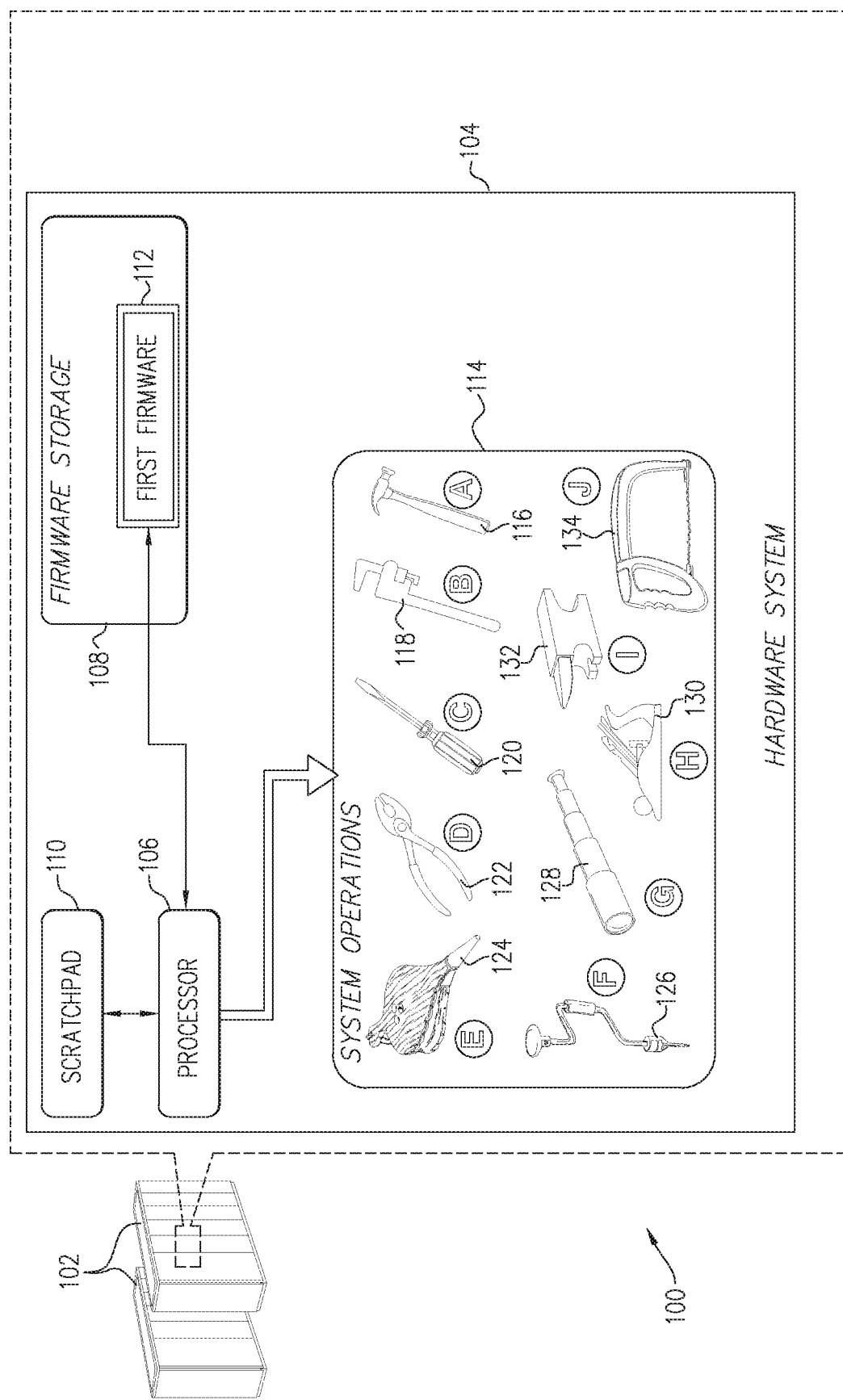
FIGS. 1A-1C are simplified partly pictorial, partly block diagram illustrations of a system for carrying out in-service update and/or upgrade of software, the system being constructed and operative in accordance with an exemplary embodiment of the present invention.
Figure 1B:
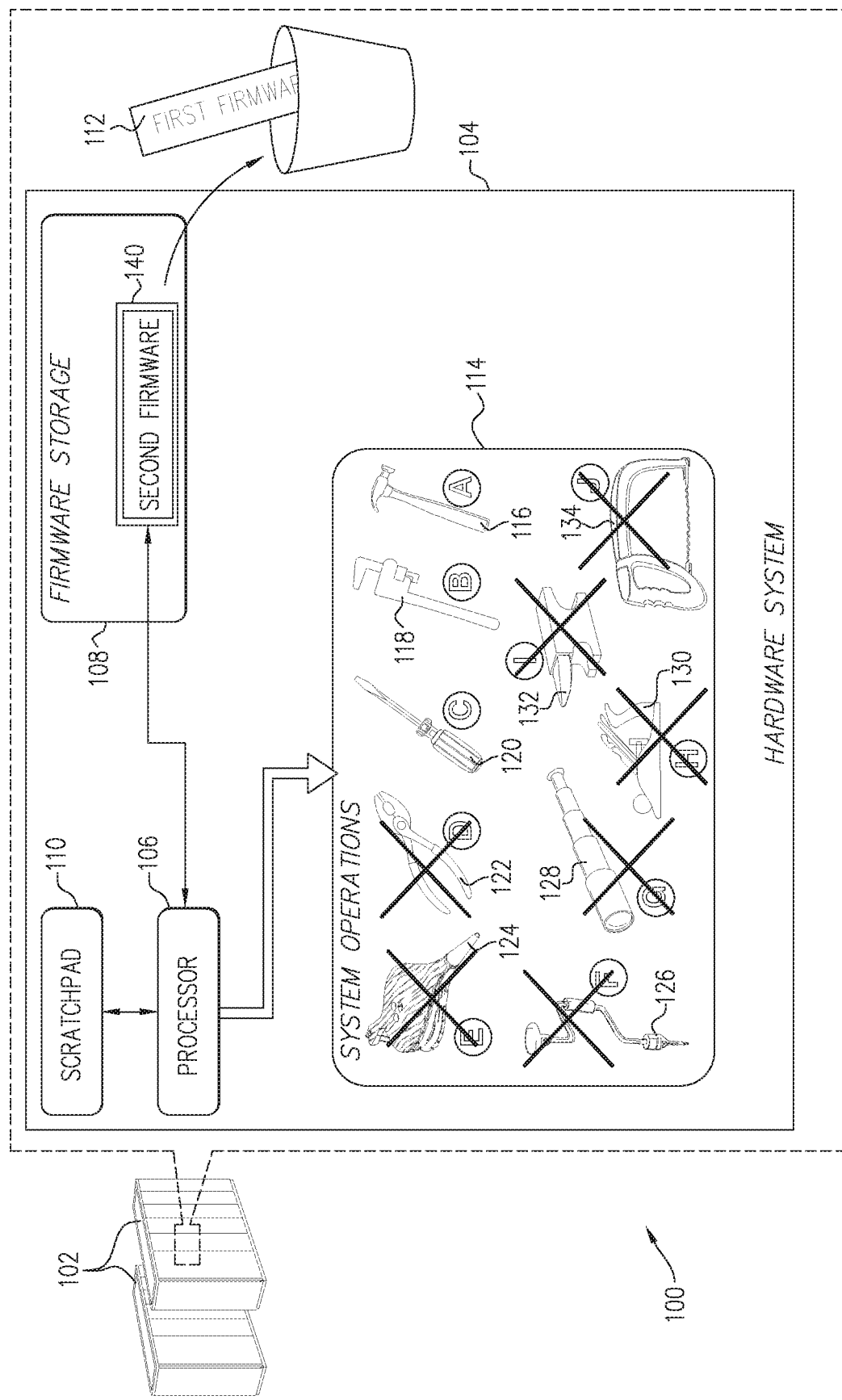
Figure 1C:
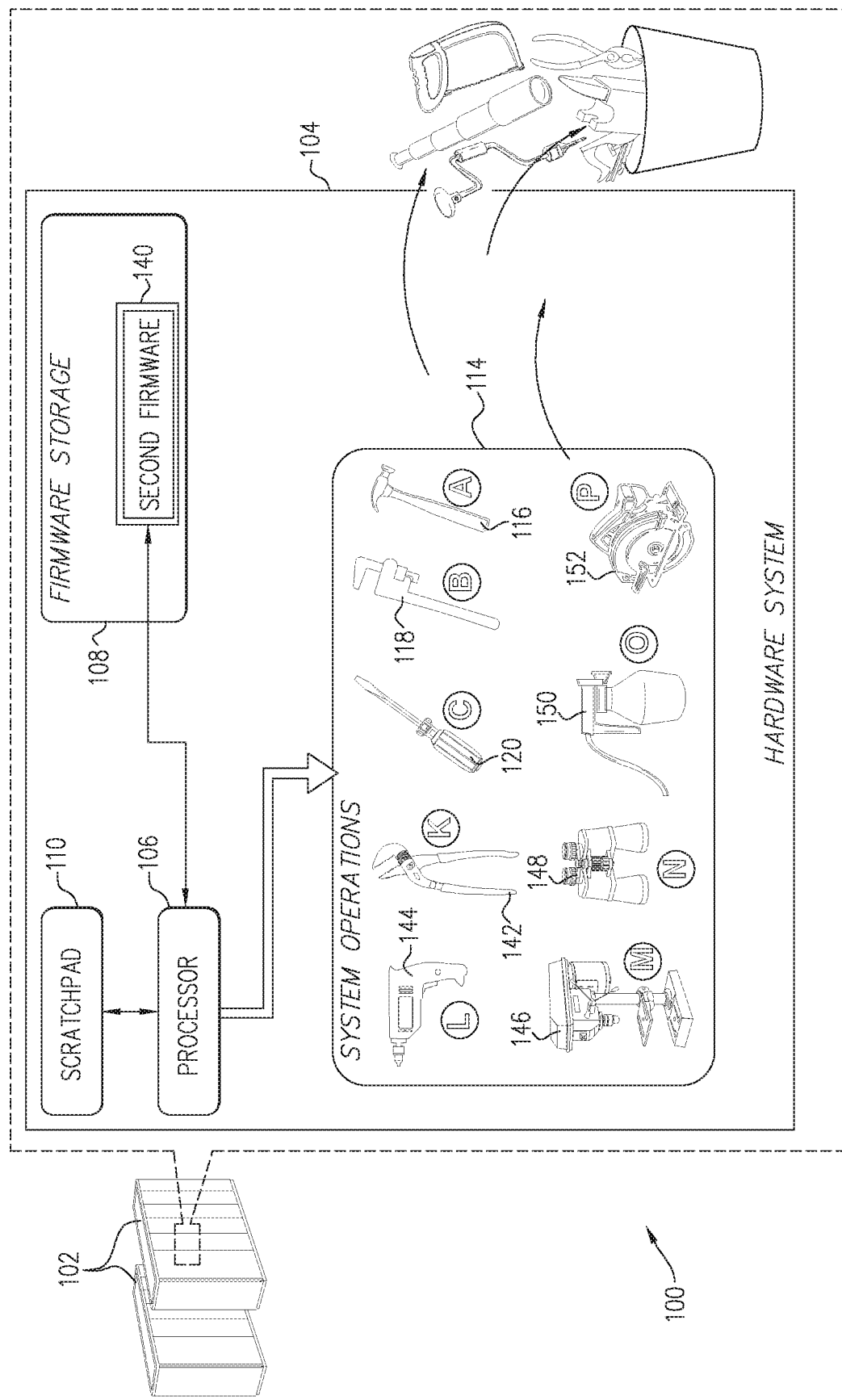

Reference is now made to FIGS. 1A-1C, which are simplified partly pictorial, partly block diagram illustrations of a system for carrying out in-service update and/or upgrade of software, the system being constructed and operative in accordance with an exemplary embodiment of the present invention. Elements having like reference numerals in FIGS. 1A-1C represent elements which are the same in FIGS. 1A-1C.

Referring specifically to FIG. 1A, a system, generally designated 100, is shown. The system 100 is shown as comprising one or more computer systems 102, which may each comprise any appropriate computer systems such as, by way of non-limiting example, any appropriate hardware-based switch. While two computer systems 102 are depicted in FIG. 1A for purposes of simplicity of description, it is appreciated that any other appropriate number of computer systems 102 may be used.

By way of non-limiting example, one of the computer systems 102 is shown as comprising a hardware system (which may be a hardware subsystem) 104; it is appreciated that more than one, or all, of the computer systems 102 may comprise a hardware system 104, only one hardware system 104 being depicted in FIG. 1A for simplicity of depiction and description.

The hardware system 104 is depicted as comprising the following components (it being appreciated that other components may also be comprised therein):

a processor 106, which may comprise any appropriate processor instantiated in hardware;

firmware storage 108, which may comprise any appropriate hardware memory (by way of non-limiting example, non-volatile memory, and by way of further specific non-limiting example, electronically erasable programmable read only memory (EEPROM), as is known in the art); and a scratchpad 110, the scratchpad comprising hardware memory, for example a RAM, used for temporary storage of calculations, data, and other work in progress.

It is appreciated that the processor 106, while depicted and generally described herein as a single processor, may comprise a plurality of processors; in such a case, operations described herein as being carried out by the processor 106 may be split between two or more of the plurality of processors, as is known in the art. One or more of the processors may be connected to/associated with other conventional components (such as RAM, disk storage, communication hardware and software for communicating with other systems such as, by way of non-limiting example, for communicating via the Internet), as is known in the art.

The firmware storage 108 and the scratchpad 110 are associated with the processor 106 via appropriate connections, such as one or more buses. Typically (as indicated by arrows between the processor 106, the firmware storage 108, and the scratchpad 110 in FIG. 1A), the processor is in two-way communication with the scratchpad 110, and may be in only one-way communication with the firmware storage 108, in that in such a case the processor 106 receives data but does not send data to the firmware storage 108 (although the communication between the processor 106 and the firmware storage 108 may alternatively be two-way, as is shown in FIG. 1).

An exemplary mode of operation of the system of FIG. 1A is now briefly described. The system of FIG. 1A shows the hardware system 104 in a first configuration.

The firmware storage 108 stores first firmware 112. Firmware, as is known in the art, is a type of computer software that provides low-level control for the hardware of a device; in the exemplary system of FIG. 1A, the first firmware 112, when loaded into the processor 106, thus provides low-level control for the hardware system 104. In operation, the processor 106, when running the first firmware 112, may be operative, based on capabilities enabled by the first firmware 112, to have or to carry out a plurality of system operations 114; the plurality of system operations 114 is a characteristic of the first configuration. (It is appreciated that, in describing FIGS. 1A-1C, the term "system operations" is used to include a variety of possibilities, without limiting the generality of the foregoing, "system states", as described below with reference to FIGS. 2A-2C, may also be included in "system operations"). The plurality of system operations 114, by way of non-limiting example, are shown in FIG. 1A as:

system operation A, reference numeral 116;
system operation B, reference numeral 118;
system operation C, reference numeral 120;
system operation D, reference numeral 122;
system operation E, reference numeral 124;
system operation F, reference numeral 126;
system operation G, reference numeral 128;
system operation H, reference numeral 130;
system operation I, reference numeral 132; and
system operation J, reference numeral 134.

Referring specifically to FIG. 1B, certain ones of the plurality of system operations 114 have been disallowed; with those operations disallowed, the hardware system 104 is in an intermediate configuration. By way of specific non-limiting example, those of the plurality of system operations 114 which have not been disallowed in the intermediate configuration of FIG. 1B, relative to FIG. 1A, are:

system operation A, reference numeral 116;
system operation B, reference numeral 118;
system operation C, reference numeral 120.

All of the other ones of the plurality of system operations 114 shown in FIG. 1A have been disallowed in the intermediate configuration of FIG. 1B; for sake of depiction, those disallowed system operations are each shown as covered by an X symbol, to indicate that those operations are disallowed.

A motivation for allowing particular ones of the plurality of system operations 114 while disallowing other ones of the plurality of system operations 114 is to improve operation of the hardware system 104 as follows. As explained above, firmware, as is known in the art, is a type of computer software that provides low-level control for the hardware of a device; in the exemplary system of FIG. 1A, the first firmware 112, when loaded into the processor 106, provides low-level control for the hardware system 104. In operation, the processor 106, when running the first firmware 112, may be operative, based on capabilities enabled by the first firmware 112, to have or to carry out a plurality of system operations 114; the plurality of system operations 114 is a characteristic of the first configuration. When it is desired to replace the first firmware 112 by second firmware 140, while the first firmware 112 is being replaced by the second firmware 140, it may not be possible to operate the hardware system 114 with full functionality; certain ones of the plurality of system operations 114 may be impossible, or undesirable, during replacement of the first firmware 112 by the second firmware 140. Particular non-limiting examples of such operations and such situations are described below with reference to FIGS. 2A-4C.

For the sake of simplicity of description and depiction, throughout the present specification replacement of first firmware with second firmware is described as if the second firmware is loaded and the first firmware is removed (such as, loaded into the firmware storage 108 and removed therefrom). It is appreciated that, alternatively, both the first firmware and the second firmware may be simultaneously present in firmware storage, such that replacement of first firmware with second firmware may comprise beginning to operate with second firmware while ceasing to operate with first firmware. It is likewise appreciated that operations of firmware replacement may take place in a reverse direction, with second firmware being replaced by firmware; this could, by way of non-limiting example, represent a reversion to a previous firmware version or a firmware version downgrade.

As depicted in FIG. 1B, the first firmware has been replaced with the second firmware 140; as described immediately above, this replacement generally takes place after certain ones of the plurality of system operations 114 have been disallowed, as described above. In the configuration depicted in FIG. 1B, the first firmware, shown for the sake of simplicity of depiction as having been removed, might still be present but functional in a limited way, or non-functional (no longer activated). The second firmware 140, in a case as described above where the second firmware 140 is not already (simultaneously) present in the firmware storage 108 along with the first firmware 112, may be loaded into the firmware storage by the processor 106; more specifically, in a case where the processor 106 comprises a plurality of processors as described above, the second firmware 140 may be obtained via the Internet by a processor in connection therewith; obtaining, verifying, and loading new firmware in such a way is well-known such as, for example, in loading a new BIOS in home computer systems.

Without limiting the generality of exemplary embodiments of the present invention, system operations as described herein may include, but not be limited to: varying system fan speed; causing system indicators such as LEDs to blink in various ways; carrying out various system initialization tasks; and manipulating system data structures such as, by way of non-limiting example, hash tables. Various examples of the foregoing are described herein in more detail.

Referring specifically to FIG. 1C, the hardware system 104 is now shown in a second configuration, in which the second firmware 140 has been activated; that is, the second firmware 140 has been loaded into the processor 106, is running in the processor 106, and is thus controlling operation of the hardware system 104. The plurality of system operations 114 is now depicted, with those of the plurality of system operations which were disallowed in the intermediate configuration of FIG. 1B as having been removed by the system, and with the plurality of system operations 114 in the second configuration as comprising, by way of non-limiting example:

system operation A, reference numeral 116;
system operation B, reference numeral 118;
system operation C, reference numeral 120;
system operation K, reference numeral 142;
system operation L, reference numeral 144;
system operation M, reference numeral 146;
system operation N, reference numeral 148;
system operation O, reference numeral 150; and
system operation P, reference numeral 152.

It is appreciated that generally the plurality of system operations A-J depicted in FIG. 1A ("first plurality of operations") are not identical to the plurality of system operations A-C and K-P depicted in FIG. 1C ("second plurality of operations"). At least some of the first plurality of operations and the second plurality of operations might have identical effects, but might be carried out differently, and would still be termed herein "not identical"; by way of non-limiting example, at least some of the second plurality of operations might take place more efficiently than corresponding operations in the first plurality of operations, but might produce the same effect.

Reference is now additionally made to FIG. 5, which is a simplified block diagram illustration of an exemplary method of operation of the system of FIGS. 1A-1C. The method of FIG. 5, generally designated 500, will be understood with reference to FIGS. 1A-1C and the above description thereof. Specifically, the exemplary method of FIG. 5 comprises the following steps:

In step 510, the configuration of a system comprising a processor, firmware storage and an on-system hardware scratchpad is altered from a first configuration in which the firmware storage stores a first version of firmware run by the processor, into a second configuration in which the firmware storage stores a second version of firmware run by the processor. The first version of the firmware enables the system to carry out a first plurality of operations and the second version of the firmware enables the system to carry out a second plurality of operations; the first plurality of operations and the second plurality of operations are not identical The altering of step 510 includes:
A) re-configuring the system from the first configuration into an intermediate configuration in which the processor continues to run the first version of the firmware (step 520);
B) while the system is in the intermediate configuration, disallowing at least one of the first plurality of operations (step 530);
C) re-configuring the system from the intermediate configuration to the second configuration (step 540); and
D) while the system is in the second configuration, allowing the second plurality of operations (step 550).

It is appreciated that the method depicted in FIG. 5 and described immediately above may also operationally include other steps which are described elsewhere herein with reference to FIGS. 1A-4C.

The system various system operations described above with reference to FIGS. 1A-1C have been described in a general way, and are described more specifically with reference to exemplary embodiments of the exemplary system of FIGS. 1A-1C are now described. In the exemplary embodiments now described, like reference numerals refer to elements which are the same in the various drawings (including in FIGS. 1A-1C).

Figure 2A:
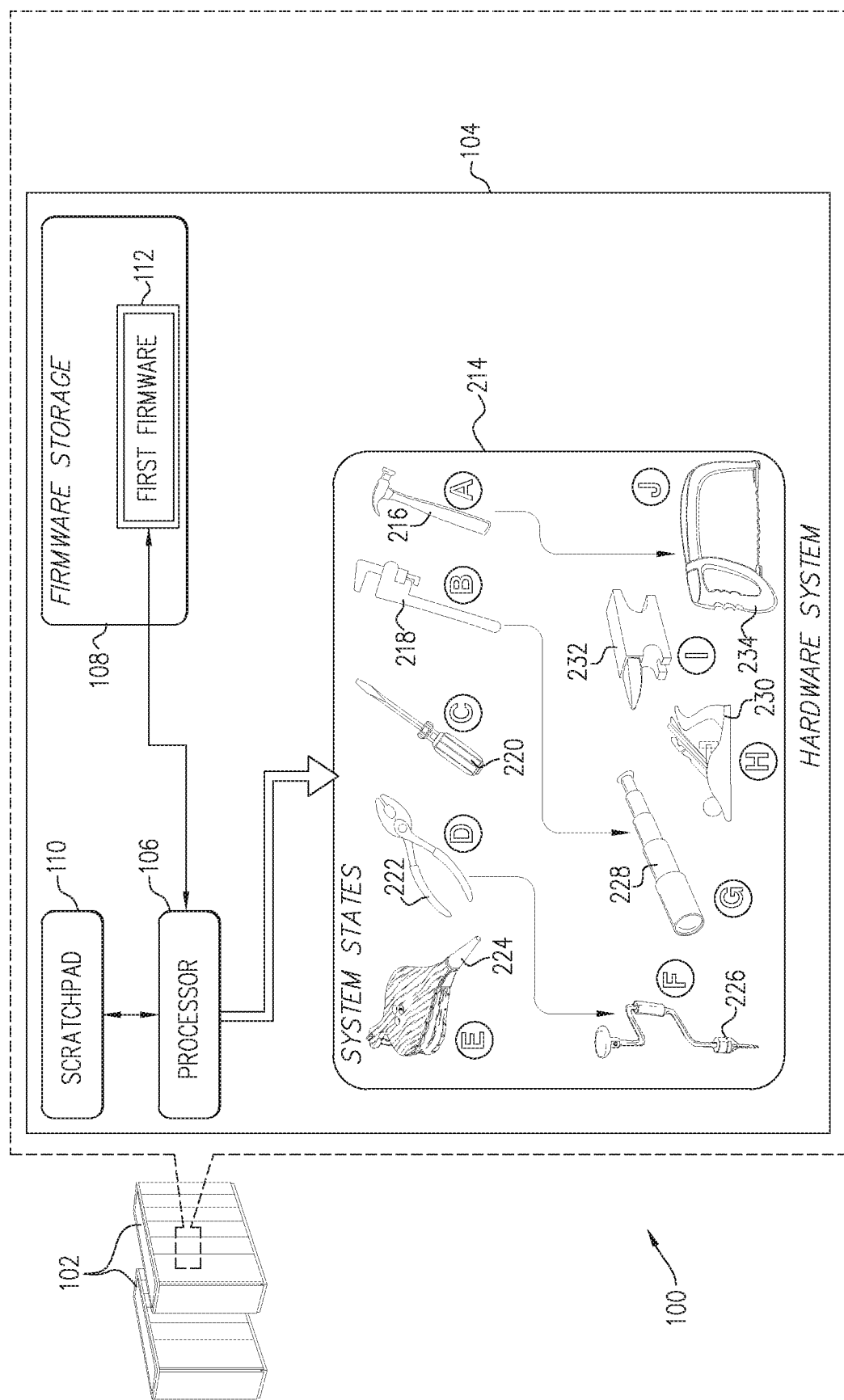
FIGS. 2A-2C are simplified partly pictorial, partly block diagram illustrations of an exemplary embodiment of the system of FIGS. 1A-1C.
Figure 2B:
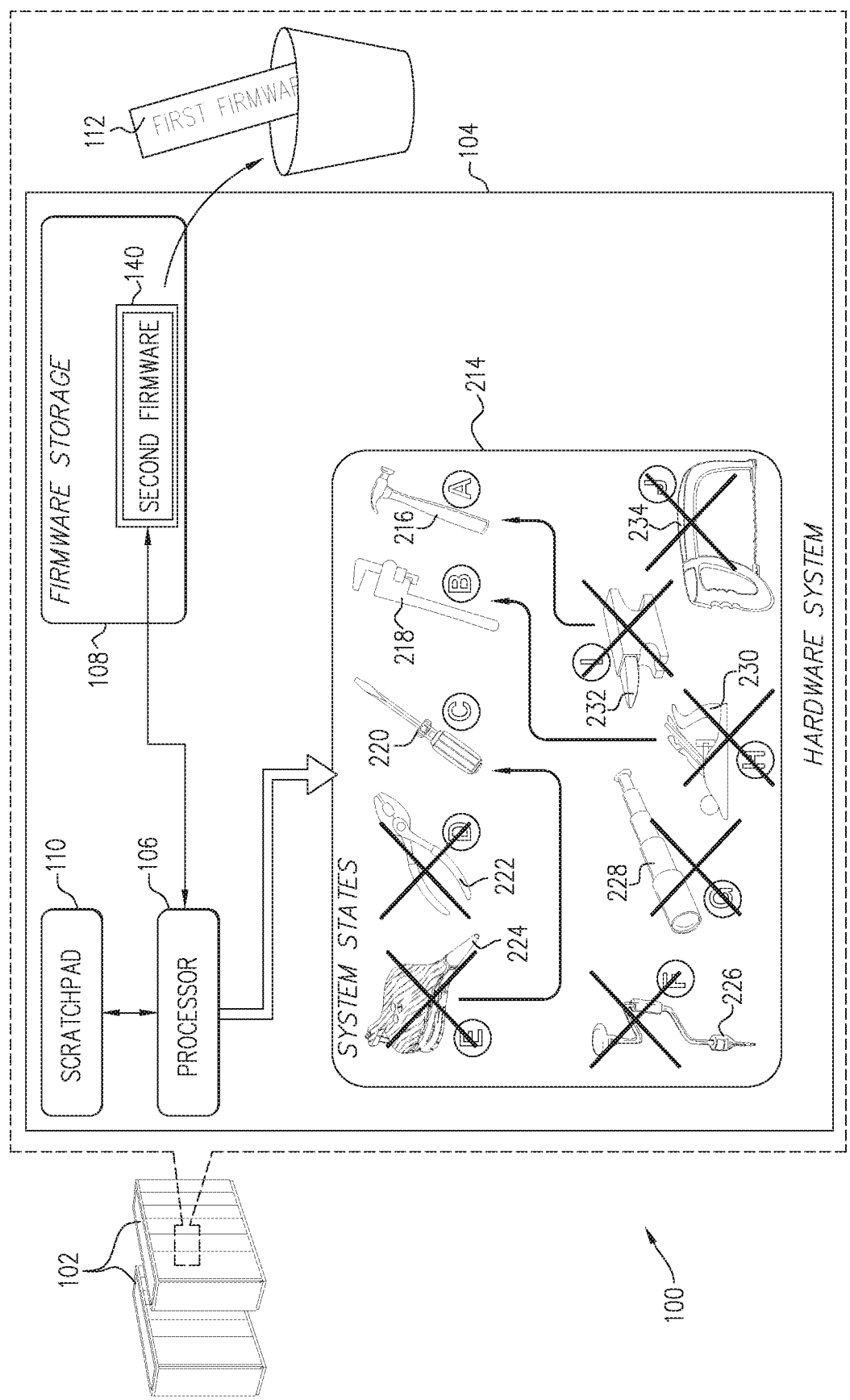
Figure 2C:
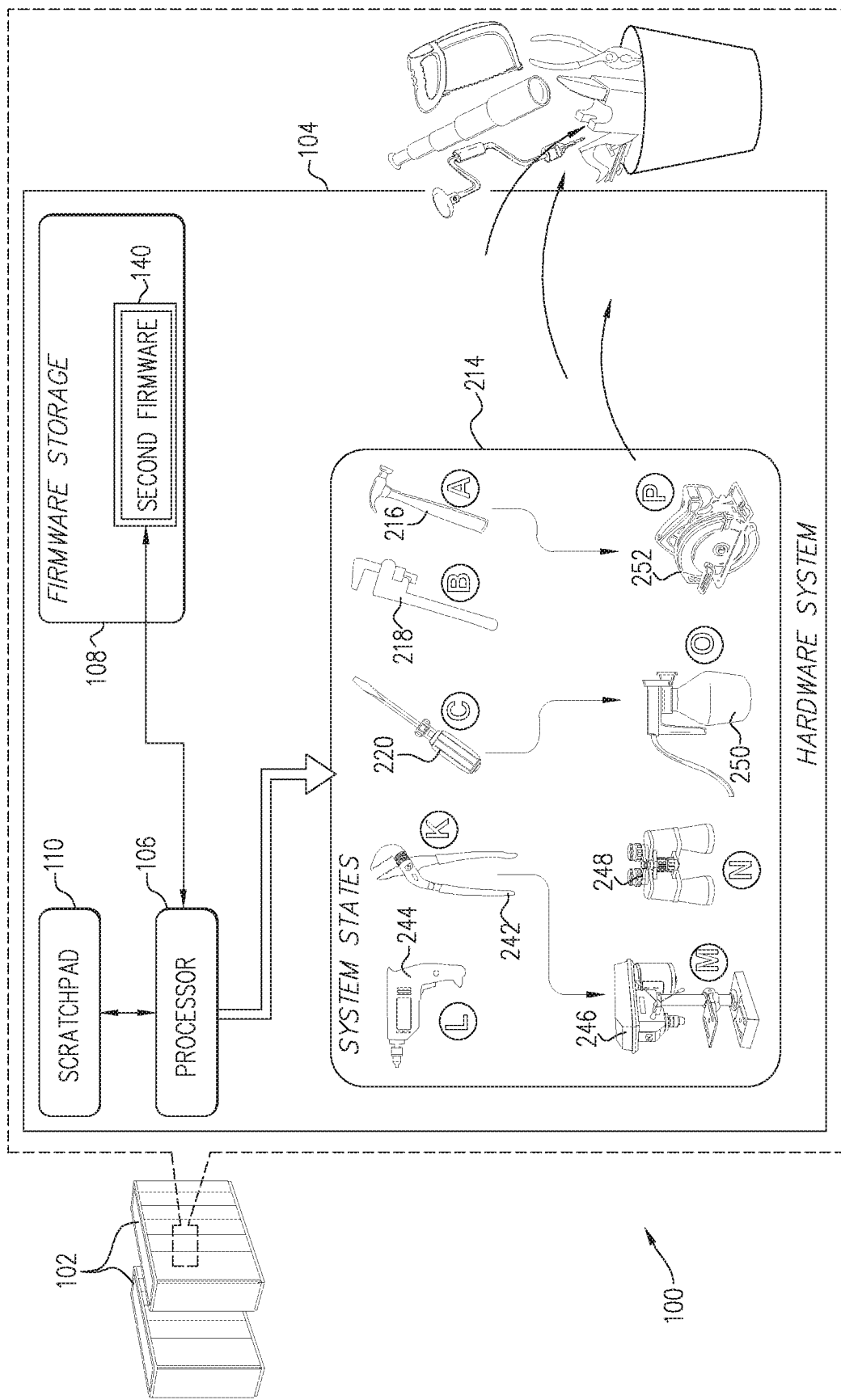

Reference is now made to FIGS. 2A-2C, which are simplified partly pictorial, partly block diagram illustrations of an exemplary embodiment of the system of FIGS. 1A-1C. The exemplary embodiment of FIGS. 2A-2C relates to a situation in which the plurality of system operations 114 of FIGS. 1A-1C comprise a plurality of system states 214.

For purposes of simplicity of depiction and description, the plurality of system states 214 of FIGS. 2A-2C are depicted similarly to the plurality of system operations 114 of FIGS. 1A-1C.

The system of FIG. 2A shows the hardware system 104 in a first configuration. The plurality of system states 214 of FIG. 2A comprise: system state A, reference numeral 216;
system state B, reference numeral 218;
system state C, reference numeral 220;
system state D, reference numeral 222;
system state E, reference numeral 224;
system state F, reference numeral 226;
system state G, reference numeral 228;
system state H, reference numeral 230;
system state I, reference numeral 232; and
system state J, reference numeral 234.

An exemplary mode of operation of the system of FIG. 2A is now briefly described. The firmware storage 108 stores first firmware 112. In operation, the processor 106, when running the first firmware 112, may be operative, based on capabilities enabled by the first firmware 112, to provide the plurality of system states 214 as described above, and to allow certain transitions therebetween. By way of particular non-limiting example, the following state transitions are shown in FIG. 2A, it being appreciated that other state transitions (not shown in FIG. 2A for simplicity of depiction) may also be allowed:

from system state A, reference numeral 216, to system state J, reference numeral 234;

form system state B, reference numeral 218, to system state G, reference numeral 228; and from system state D, reference numeral 222, to system state F, reference numeral 226.

Referring specifically to FIG. 2B, the system of FIG. 2A is shown with certain ones of the plurality of system states 214 of FIG. 2A disallowed; with certain others of the plurality of system states 214 of FIG. 2A remaining allowed; and with state transitions only allowed into those ones of the plurality of system states 214 which remain allowed.

By way of specific non-limiting example, those of the plurality of system states 214 which have not been disallowed in the intermediate configuration of FIG. 2B, relative to FIG. 2A, are:

system state A, reference numeral 216;
system state B, reference numeral 218; and
system state C, reference numeral 220.

All of the other ones of the plurality of system states 214 shown in FIG. 2A have been disallowed in the intermediate configuration of FIG. 2B; for sake of depiction, those disallowed system states are each shown as covered by an X symbol, to indicate that those states are disallowed.

A motivation for allowing particular ones of the plurality of system states 214 while disallowing other ones of the plurality of system states 214 is to improve operation of the hardware system 104 as follows. As explained above, firmware, as is known in the art, is a type of computer software that provides low-level control for the hardware of a device; in the exemplary system of FIG. 2A, the first firmware 112, when loaded into the processor 106, provides low-level control for the hardware system 104. In operation, the processor 106, when running the first firmware 112, may be operative, based on capabilities enabled by the first firmware 112, to allow a plurality of system states 214; the plurality of system states 214 is a characteristic of the first configuration. When it is desired to replace the first firmware 112 by second firmware 140, while the first firmware 112 is being replaced by the second firmware 140, it may not be possible to operate the hardware system 114 with full functionality; certain ones of the plurality of system states 214 may be impossible, or undesirable, during replacement of the first firmware 112 by the second firmware 140. An example of such a situation is described below with reference to FIG. 2C

As depicted in FIG. 2B, the first firmware 112 has been replaced with the second firmware 140; as described immediately above, this replacement generally takes place after certain ones of the plurality of system states 214 have been disallowed, as described above. Again, as described above, to bring the hardware system 104 into a state wherein only the allowed ones of the plurality of system states 214 are in use, typically before replacement of the first firmware 112 with the second firmware 140, only certain transitions between various ones of the plurality of system states may be allowed in the situation depicted in FIG. 2B (namely, only transitions to those ones of the plurality of system states 214 which are allowed in the situation depicted in FIG. 2B). Allowing only those certain transitions may be helpful in placing the hardware system 104 into a state in which replacement of the first firmware 112 with the second firmware 140 can take place, so that only those ones of the plurality of system states 214 which are possible during replacement of the first firmware 112 by the second firmware 140 will remain after those certain transitions. By way of particular non-limiting example, the following transitions are shown as allowed in FIG. 2B:

from state E, reference numeral 224 to state C, reference numeral 120;

from state H, reference numeral 230, to state B, reference numeral 118; and from state I, reference numeral 232, to state A, reference numeral 116.

The term "quiescing", in its various grammatical forms, is used herein to describe a process of disallowing certain transitions between certain states, as described immediately above. In addition to the situation described above, in which only certain transitions are allowed, in certain exemplary embodiments of the present invention the processor 106 may force the allowed transitions to take place, in order to place the hardware system 104 into a state where the hardware system 104 is only in one of the allowed states (in the particular non-limiting example of FIG. 2B, in one of: system state A, reference numeral 216; system state B, reference numeral 218; and system state C, reference numeral 220). Such allowed states may, in exemplary embodiments, be limited to states present in both (for example) the first configuration the second configuration as described herein; further, in certain exemplary embodiments, given that the first configuration is associated with first firmware and the second configuration with second firmware, such states may be limited to states present in a plurality of version of firmware associated with a plurality of configurations.

By way of one particular non-limiting example, in a case in which the one or more computer systems 102 comprise one or more switches, allowed states during the intermediate configuration of FIG. 2B might include "up" (indicating that the switch or switches are all functioning); "down" (indicating that none of the switches is functioning); and "partial" (indicating that at least one switch is functioning and at least one switch is not functioning). In the intermediate configuration of FIG. 2B, other states which might include more complex or "subtle" information about the state the one or more computer systems 102 are disallowed. Similarly, such states as described may refer to particular ports on particular switches, as opposed to entire switches. Further by way of example, for some particular configurations (referring back to FIG. 2A) each port might be able to be in a state of "up", "down", or in (again by way of very specific non-limiting example), five additional specific states; in FIG. 2B, each port might be limited to be in a state of "up" or "down"; and in FIG. 2C (described below), each port might be able to be in a state of "up", "down", or in twelve additional specific states. It is appreciated that the twelve additional specific states would not entirely, and might not at all, overlap with the five additional specific states; allowing only the "up" and "down" states in FIG. 2B, those states being present in all configurations, enables a smooth transition between firmware versions without needing to shut down all or part of the one or more computer systems 102. It is further appreciated that, in general, information concerning such states, including which port is in which state at any given time, may be stored in the scratchpad 110.

Referring specifically to FIG. 2C, the hardware system 104 is now shown in a second configuration, in which the second firmware 140 has been activated; that is, the second firmware 140 has been loaded into the processor 106, is running in the processor 106, and is thus controlling operation of the hardware system 104. The plurality of system states 114 is now depicted with those of the plurality of system states which were disallowed in the intermediate configuration of FIG. 2B as having been removed by the system, and with the plurality of system states 114 in the second configuration as comprising, by way of non-limiting example:

system state A, reference numeral 216;
system state B, reference numeral 218;
system state C, reference numeral 220;
system state K, reference numeral 242;
system state L, reference numeral 244;
system state M, reference numeral 246;
system state N, reference numeral 248;
system state O, reference numeral 250; and
system state P, reference numeral 252.

Figure 6:
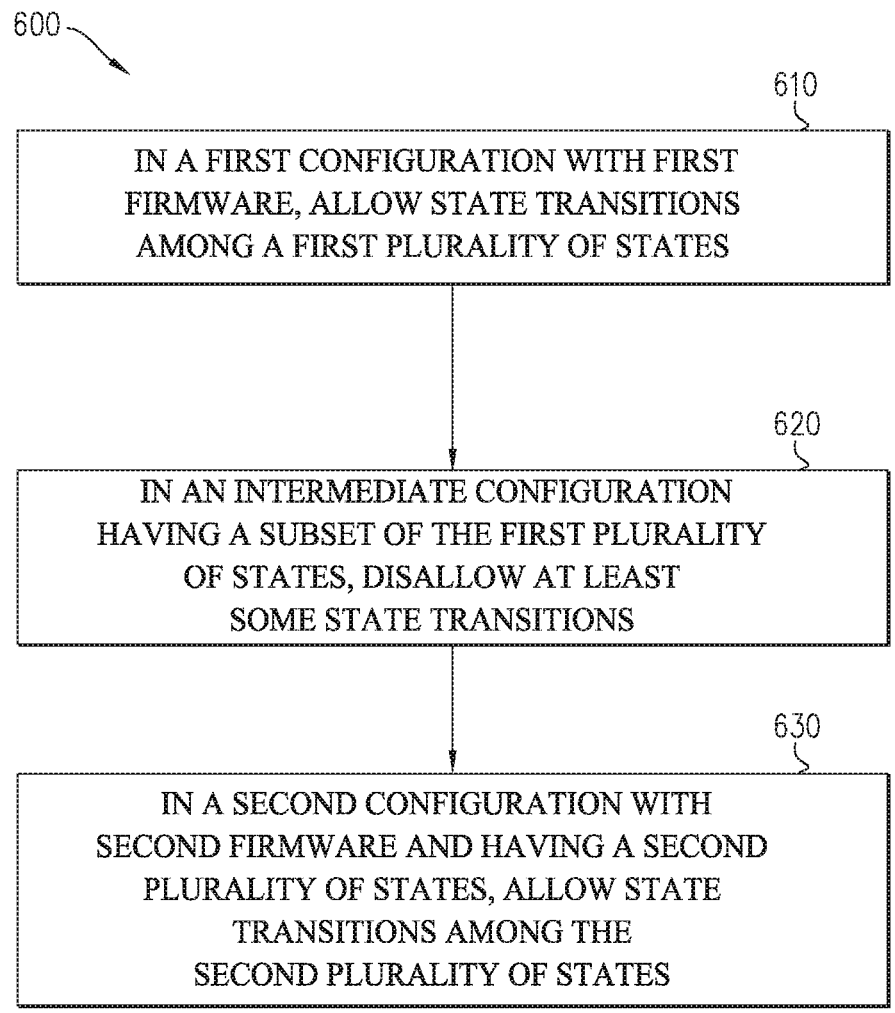

Reference is now additionally made to FIG. 6, which is a simplified block diagram illustration of an exemplary method of operation of the system of FIGS. 2A-2C. The method of FIG. 6, generally designated 600, will be understood with reference to FIGS. 2A-2C and the above description thereof. Specifically, the exemplary method of FIG. 6 comprises the following steps:

In a first configuration with first firmware, state transitions are allowed among a first plurality of states (step 610).

In an intermediate configuration, in which there are a subset of the first plurality of states, some state transitions are disallowed (step 620). As explained above, step 620 may be useful in quiescing the system and may include forcing those transitions which are allowed to take place.

In a second configuration with second firmware and having a second plurality of states, state transitions are allowed among the second plurality of states (step 630).

Figure 3A:
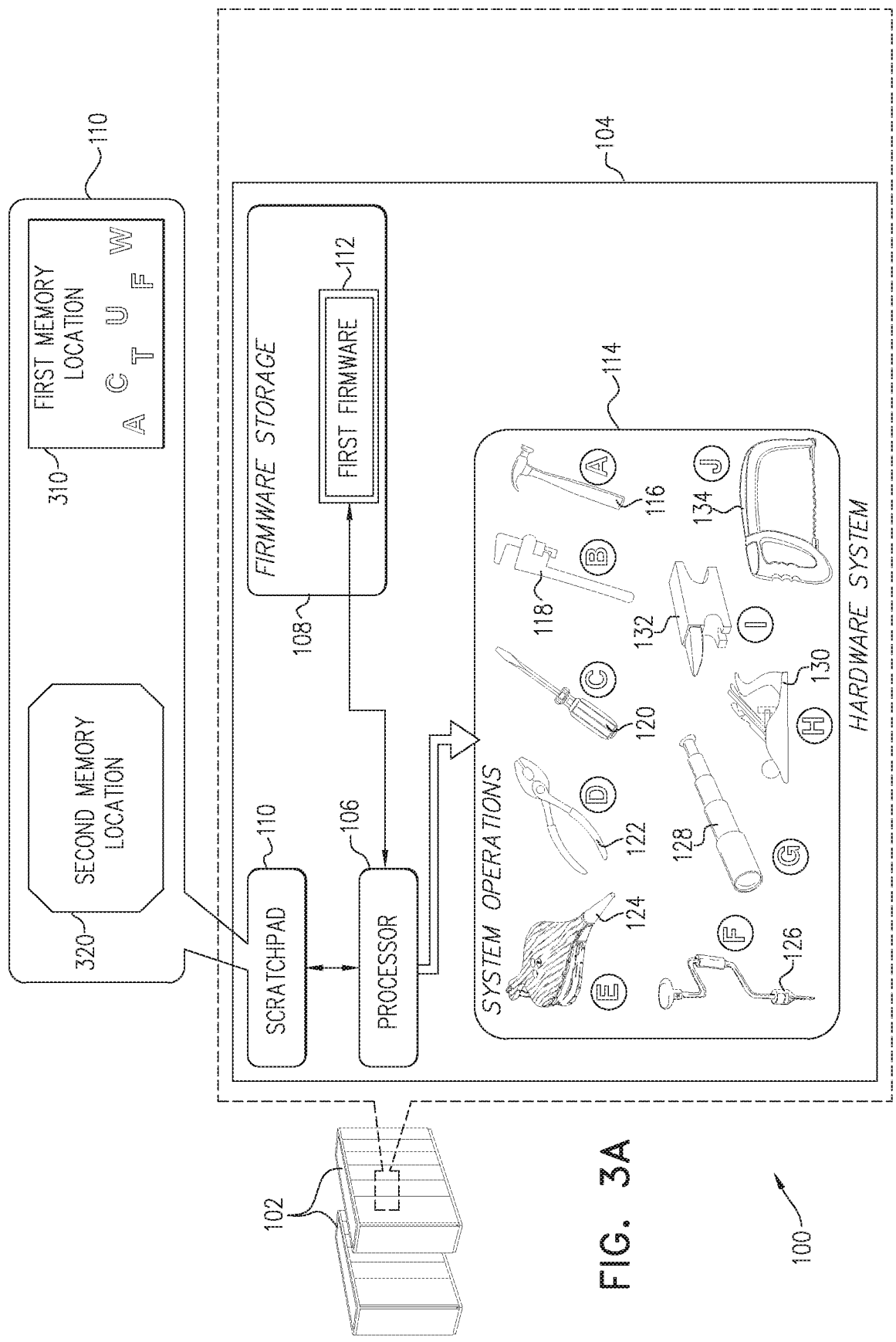
FIGS. 3A-3C are simplified partly pictorial, partly block diagram illustrations of another exemplary embodiment of the system of FIGS. 1A-1C.
Figure 3B:
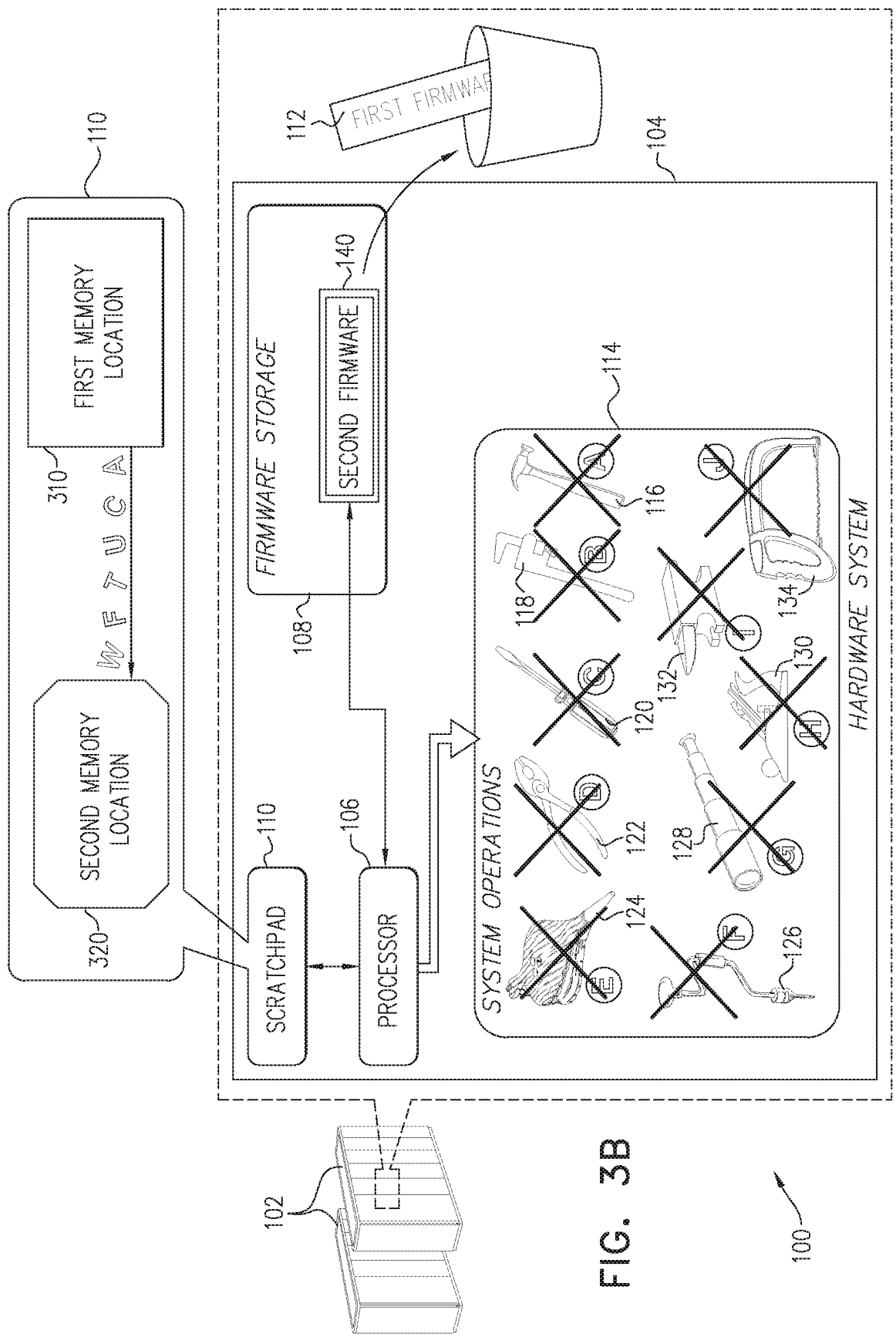
Figure 3C:
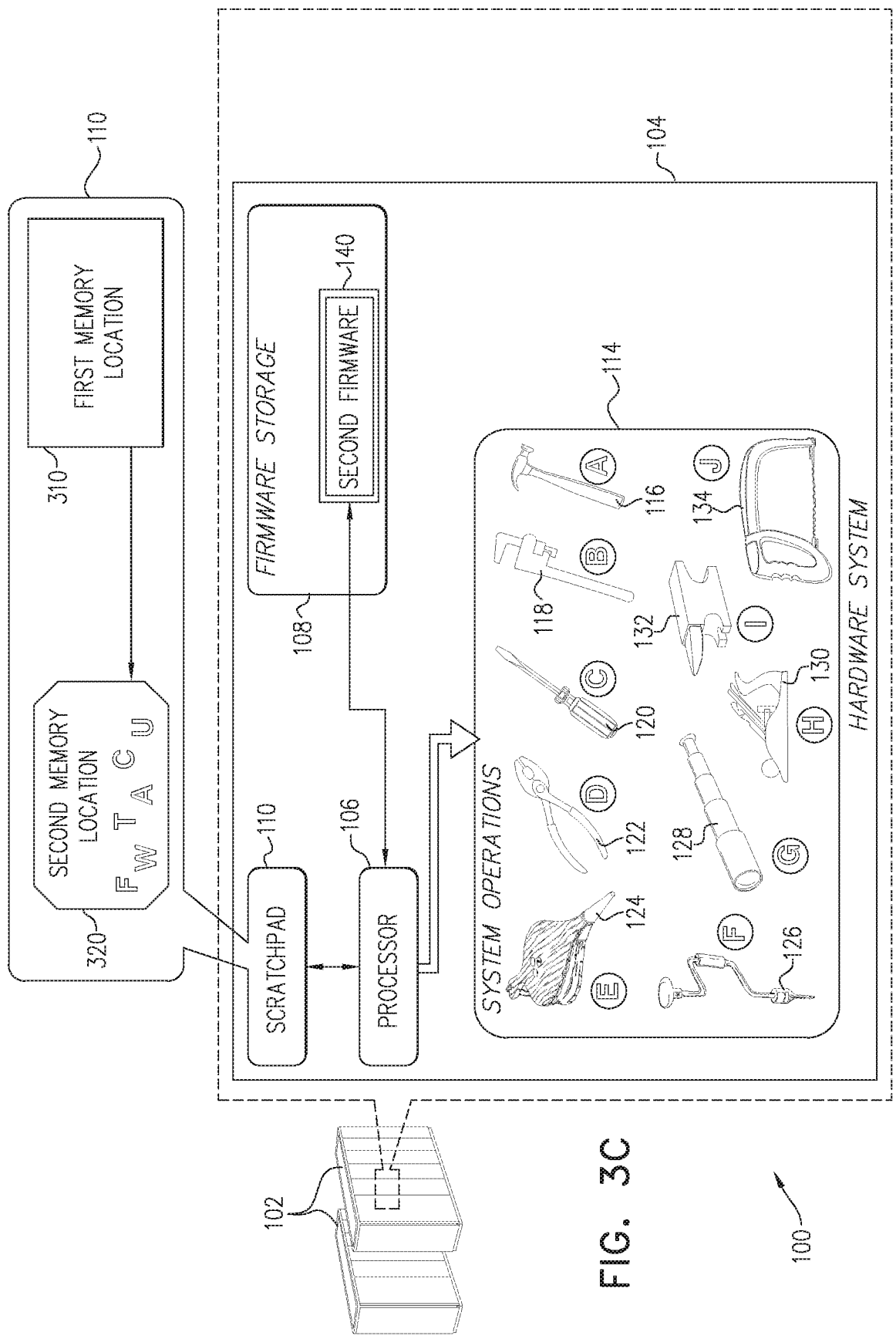

Reference is now made to FIGS. 3A-3C, which are simplified partly pictorial, partly block diagram illustrations of another exemplary embodiment of the system of FIGS. 1A-1C.

For purposes of simplicity of depiction and description, the plurality of system operations 114 of FIGS. 3A-3C are depicted similarly to the plurality of system operations 114 of FIGS. 1A-1C, may be similar thereto, and may in operation be treated similarly thereto; so that the exemplary embodiment of FIGS. 3A-3C may best be understood with reference to the above description of the exemplary embodiment of FIGS. 1A-1C, mutatis mutandis.

In FIG. 3A, a first memory location 310 and a second memory location 320 are shown as comprised in the scratchpad 110; each of the first memory location 310 and the second memory location 320 comprises a plurality of memory addresses, each adapted to store data. It is appreciated that, in some exemplary embodiments of the present invention, the first memory location 310 and the second memory location 320 may comprise distinct locations in the scratchpad 110 (as depicted in FIGS. 3A-3C), while in other exemplary embodiments the second memory location 320 may have a non-zero intersection with the first memory location 310. In such other exemplary embodiments with a non-zero intersection, the second memory location 320 may be larger or smaller than the first memory location 310.

In FIG. 3B, an intermediate configuration is depicted in which the second firmware 140 has been loaded in the firmware storage 108 but is not yet operating in the processor 106. In the situation depicted, the second firmware 140 will use the second memory location 320, whereas the first firmware 112 used the first memory location 310; in FIG. 3B, contents of the first memory location 310 is in the process of being moved to the second memory location 320, in order to allow the second firmware 140 to be able to operate. In such an intermediate configuration, all of the plurality of system operations 114 are shown as being disallowed in the intermediate configuration of FIG. 3B; for sake of depiction, those disallowed system operations are each shown as covered by an X symbol, to indicate that those operations are disallowed. Disallowing all of the plurality of system operations 114 in the intermediate configuration of FIG. 3B would be the case if the processor 106 is unable to perform any of the plurality of system operations 114 while contents of the first memory location 310 is being moved to the second memory location 320; it is appreciated that, in alternative exemplary embodiments, it might be possible for the processor 106 to perform some or all of the plurality of system operations 114 even while contents of the first memory location 310 is being moved to the second memory location 320.

In FIG. 3C, the hardware system 104 is shown in a second configuration, in which the second firmware 140 has been activated using the second memory location 320; that is, the second firmware 140 has been loaded into the processor 106, is running in the processor 106, and is thus controlling operation of the hardware system 104. In FIG. 3C, all of the plurality of system operations 114 which were shown in FIG. 3A are again shown as allowed. It is appreciated that, in other exemplary embodiments, the plurality of system operations 114 in FIG. 3C may in fact be different from the plurality of system operations 114 in FIG. 3A (similarly to the situation described above with reference to FIGS. 1A and 1C).

A motivation for the exemplary embodiment of FIGS. 3A-3C is to allow firmware upgrade including change of system memory locations used by the scratchpad 110, while allowing the hardware system 104 to continue to operate, albeit possibly with reduced functionality during said upgrade, as depicted and described with reference to FIG. 3B.

It is appreciated that, in certain exemplary embodiments of the present invention, the second firmware 140, in the case depicted in FIG. 3C, may be derived from the first firmware 112 via a code generation or parameterization operation. For example, and without limiting the generality of the foregoing:

1. Address references in the first firmware 112 may be replaced with updated address references in the second firmware 140.

2. Address references in both the first firmware 112 and in the second firmware 140 may be parameterized (may not be "hard wired", but may rather be dependent on some internal offset or fix-up, as is known in the art of computer programming), such that the parameterization may be changed/updated to produce the second firmware 140 from the first firmware 112.

Figure 7:
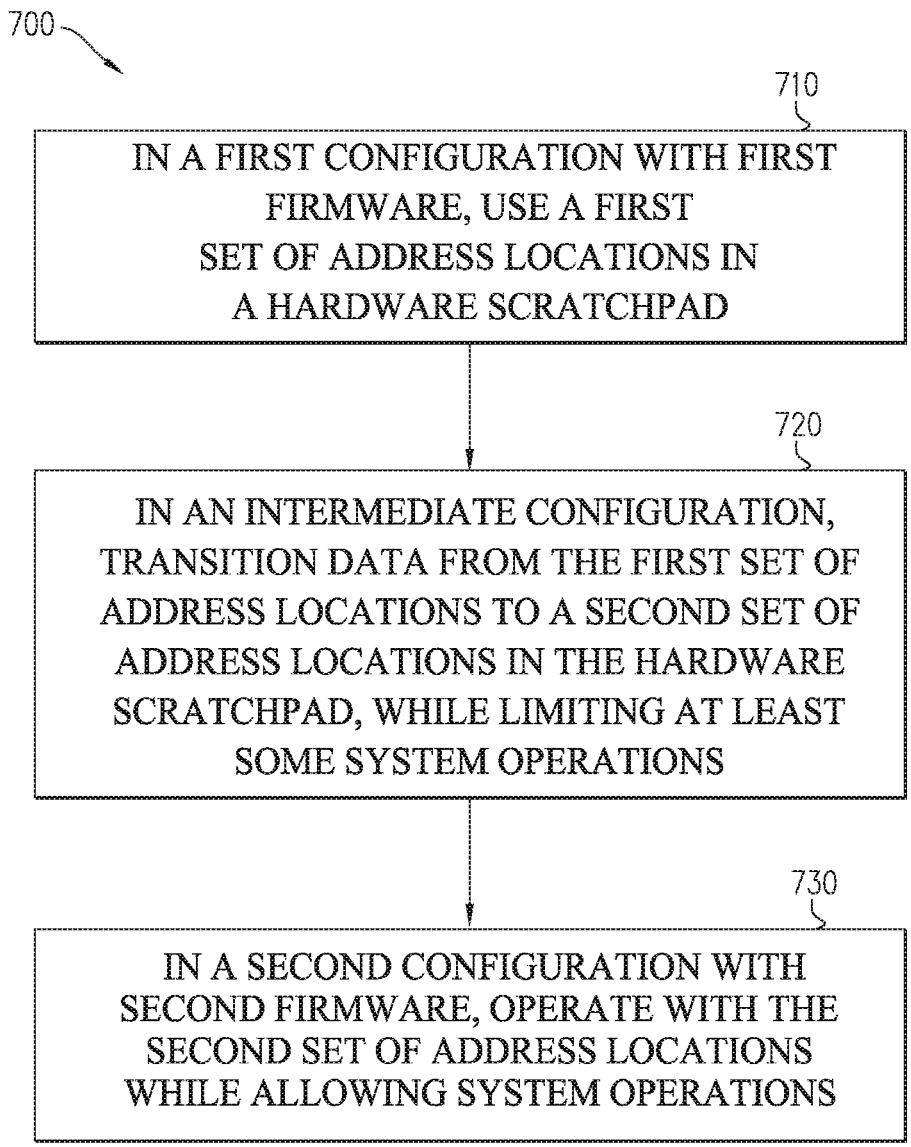

Reference is now additionally made to FIG. 7, which is a simplified flowchart illustration of an exemplary method of operation of the system of FIGS. 3A-3C. The method of FIG. 7, generally designated 700, will be understood with reference to FIGS. 3A-3C and the above description thereof. Specifically, the exemplary method of FIG. 7 comprises the following steps:

In a first configuration with first firmware, a first set of address locations in a hardware scratchpad is used (step 710).

In an intermediate configuration, data is transitioned from the first set of address locations to a second set of address locations in the hardware scratchpad, while limiting at least some system operations (step 720). Alternatives to carrying out step 720 in the intermediate configuration are described below.

In a second configuration with second firmware, system operations continue using the second set of address locations, while allowing (most or all) system operations (step 730).

Referring again to FIGS. 3A-3C, system status LEDs or indicators comprise one particular non-liming example of the use of change of system memory locations as described above. Suppose, for example, that in the first configuration as depicted in FIG. 3A, the first firmware 112 supports up to 16 LEDs, with one byte in the scratchpad 110 being used to store LED state for each such LED; thus, 16 bytes of storage in the scratchpad 110 are required. Further suppose, for example, that in the second configuration as depicted in FIG. 3C, the second firmware 140 supports up to 32 LEDs, with one byte in the scratchpad 110 being used to store LED state for each such LED; thus, 32 byes of storage in the scratchpad are required. In this example, the system operations all shown as disallowed in FIG. 3B may comprise changes in LED status of any LED. In a second non-limiting example (which may apply separately or in combination with the previously-described non-limiting example), in the first configuration depicted in FIG. 3A each LED might have a state of "on", "off", or "blinking", while in the second configuration depicted in FIG. 3C each LED might have a state of "on", "off", "blink slow", "blink medium", or "blink fast"; thus, the second configuration depicted in FIG. 3C would require more bits per each LED than would the first configuration depicted in FIG. 3A.

It is further appreciated that in the case mentioned immediately above, the first firmware 112 may not necessarily be literally "replaced" with the second firmware 140, but may rather be updated in place during the state depicted in FIG. 3B; the term "replaced", in its various grammatical forms, being understood herein to also cover such a case.

It is still further appreciated that, in general, a higher version (such as the second firmware 140) will be aware of system memory location considerations for the higher version and for one or more lower versions (such as the first firmware 112). Thus, it will be appreciated that address reference changes as described above will in general be carried out by a higher version: for example, in a transition from the first firmware 112 to the second firmware 140, the second firmware 140 will be responsible for address reference changes; in a transition from the second firmware 140 to the first firmware 112 (a downgrade as described herein), the second firmware 140 will also be responsible for address reference changes.

Figure 4A:
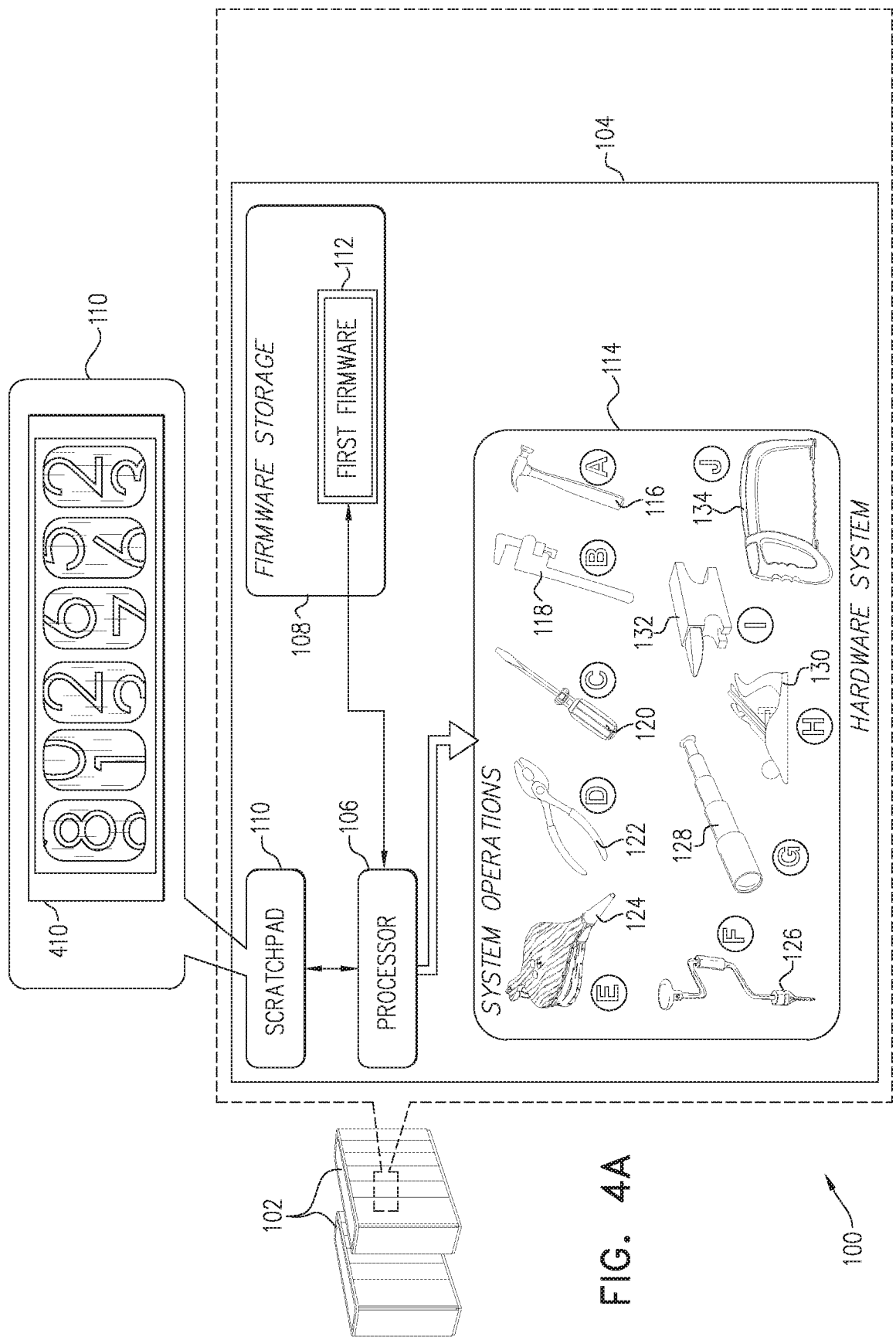
FIGS. 4A-4C are simplified partly pictorial, partly block diagram illustrations of a further exemplary embodiment of the system of FIGS. 1A-1C.
Figure 4B:
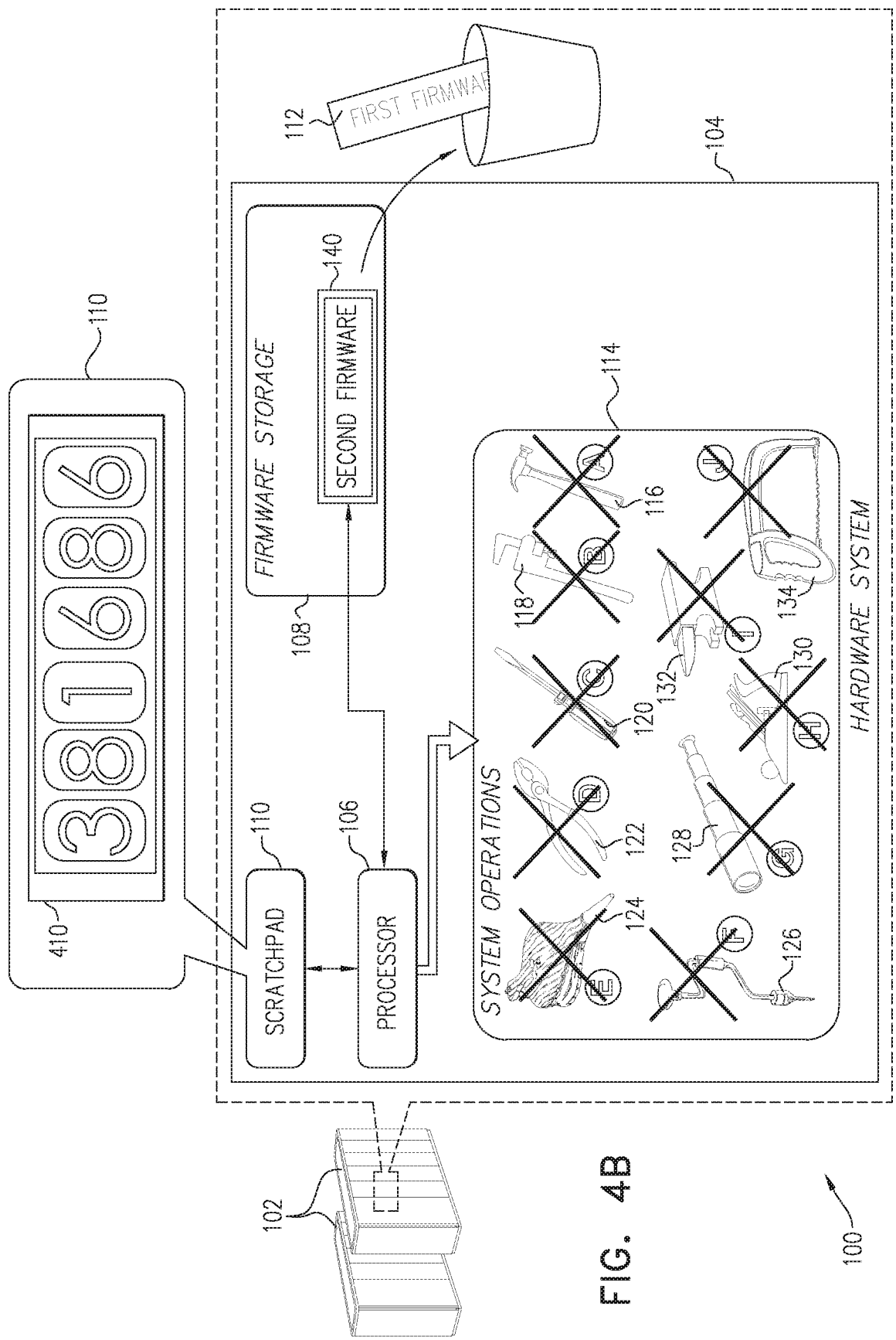
Figure 4C:
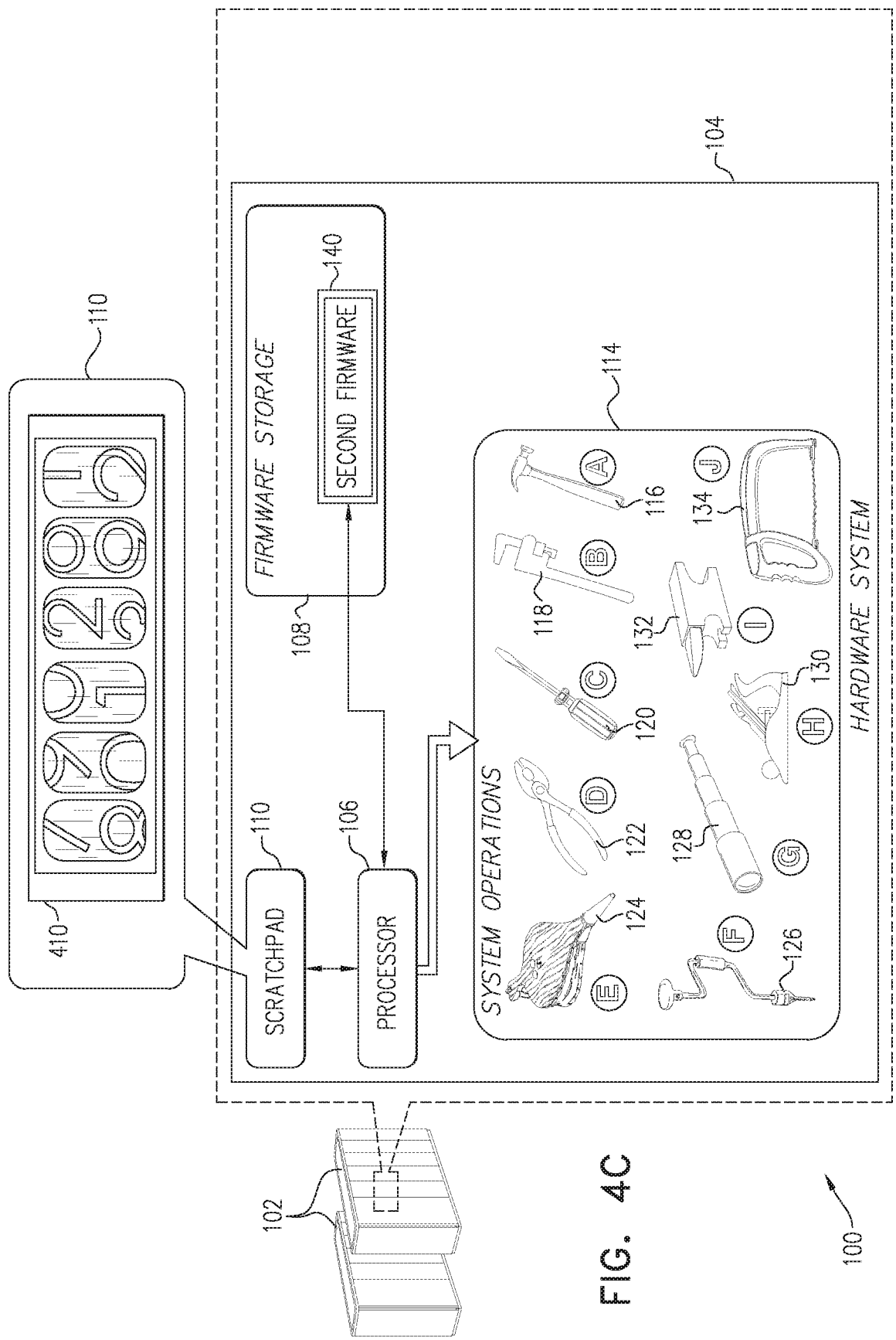

It is appreciated that while transitions between two firmware versions are described and depicted herein, transitions between multiple versions may also take place, as a linked series of transitions between two versions. For example, if the lowest version is version A and the highest version under consideration is version E, then an upgrade from version A to version E might take place as:

version A→version B→version C→version D→version E
while a downgrade from version E to version A might take place as:
version E→version D→version C→version B→version A Reference is now made to FIGS. 4A-4C, which are simplified partly pictorial, partly block diagram illustrations of a further exemplary embodiment of the system of FIGS. 1A-1C.

For purposes of simplicity of depiction and description, the plurality of system operations 114 of FIGS. 4A-4C are depicted similarly to the plurality of system operations 114 of FIGS. 1A-1C and FIGS. 3A-3C, may be similar thereto, and may in operation be treated similarly thereto; so that the exemplary embodiment of FIGS. 4A-4C may best be understood with reference to the above description of the exemplary embodiments of FIGS. 1A-1C and 3A-3C, mutatis mutandis.

In FIG. 4A, a first system parameter 410 is shown as stored in the scratchpad 110. The first system parameter 410 (which may be used, as is known in the art, by the processor 106 running the first firmware 112 to alter or control the operation of the processor 106, as is known in the art) is shown in FIG. 4A as having a value determined dynamically by the processor 106 running the first firmware 112.

In FIG. 4B, an intermediate configuration is depicted in which the second firmware 140 has been loaded in the firmware storage 108 but is not yet operating in the processor 106. In the situation depicted, the first system parameter 410 has a static value, since neither the first firmware 112 nor the second firmware 140 is running in the processor 106. In such an intermediate configuration, all of the plurality of system operations 114 are shown as being disallowed in the intermediate configuration of FIG. 4B; for sake of depiction, those disallowed system operations are each shown as covered by an X symbol, to indicate that those operations are disallowed. Disallowing all of the plurality of system operations 114 in the intermediate configuration of FIG. 4B would be the case if the processor 106 is unable to perform any of the plurality of system operations 114 while the first system parameter 410 has a static value; is appreciated that, in alternative exemplary embodiments, it might be possible for the processor 106 to perform some or all of the plurality of system operations 114 even while the first system parameter 410 has a static value.

In FIG. 4C, the hardware system 104 is shown in a second configuration, in which the second firmware 140 has been activated; that is, the second firmware 140 has been loaded into the processor 106, is running in the processor 106, and is thus controlling operation of the hardware system 104. In this case, the first system parameter 410 is again shown as having a dynamic value, similarly to the situation in FIG. 4A In FIG. 4C, all of the plurality of system operations 114 which were shown in FIG. 4A are again shown as allowed. It is appreciated that, in other exemplary embodiments, the plurality of system operations 114 in FIG. 4C may in fact be different from the plurality of system operations 114 in FIG. 4A (similarly to the situation described above with reference to FIGS. 1A and 1C).

A motivation for the exemplary embodiment of FIGS. 4A-4C is to allow firmware upgrade, including change of the way in which the first system parameter 410 is controlled and used by the processor 106, while allowing the hardware system 104 to continue to operate, albeit possibly with reduced functionality during said upgrade, as depicted and described with reference to FIG. 4B. Particular non-limiting examples of such reduced functionality situations include:

1. A variable speed fan or fans used for temperature control. In FIGS. 4A and 4C, with fully-functioning firmware, appropriate fan speed (represented in this case by the system parameter 410) would be dynamically adjusted based on system conditions, while in FIG. 4B the fan speed would need to be kept constant. Potential problems related to possible overheating in this particular example in the situation depicted in FIG. 4B could be overcome, for example, by increasing fan speed (by, for example, 10%) to achieve the constant fan speed of FIG. 4B from the dynamically adjusted fan speed of FIG. 4A. Since the situation depicted in FIG. 4B would be limited in time, use of such a constant fan speed would not generally be problematic.

2. Certain monitoring features (such as, by way of particular non-limiting example, monitoring of bit error rate (BER) or congestion in a switch) might be disabled in the situation depicted in FIG. 4B; since the principal functions of the system (switch in the present example) could continue even in the situation depicted in FIG. 4B and since such a situation would be limited in time, this situation would not generally be problematic.

The inventors of the present invention believe that, in most cases, the situation of FIG. 4B, described above to be "limited in time", would likely continue for somewhere between 4 milliseconds and 50 milliseconds.

Figure 8:
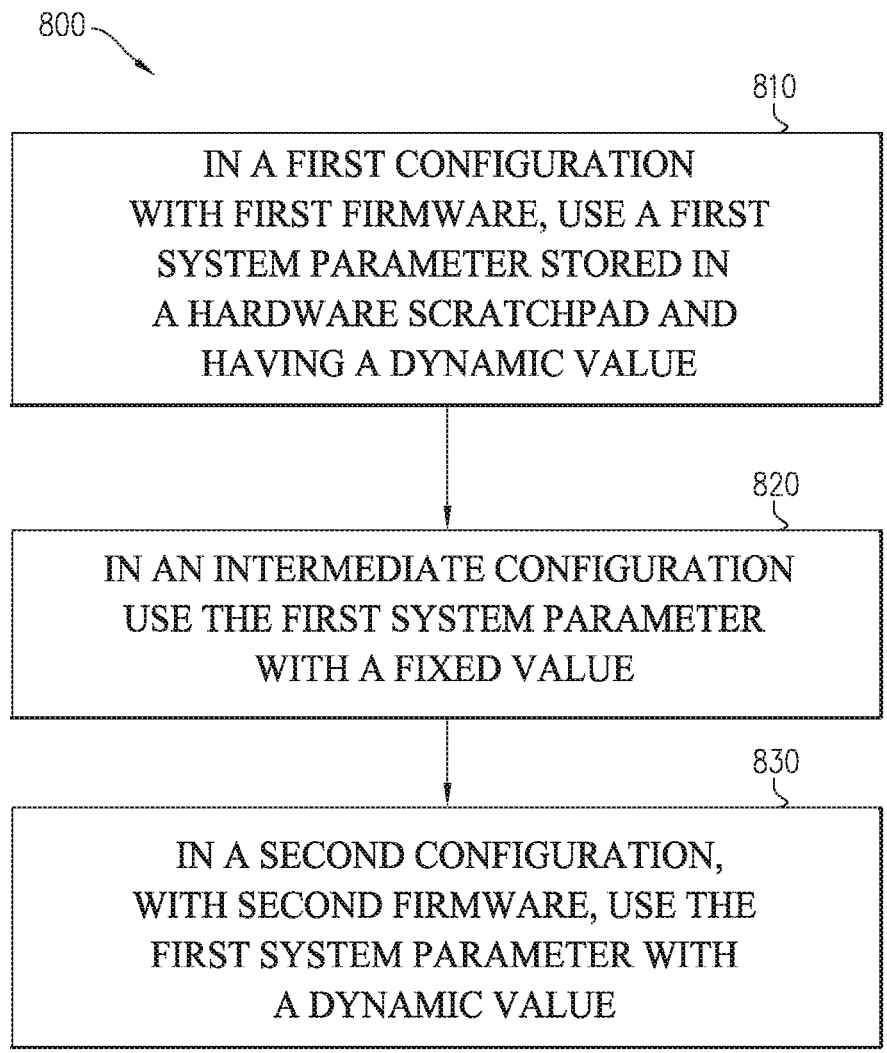

Reference is now additionally made to FIG. 8, which is a simplified flowchart illustration of an exemplary method of operation of the system of FIGS. 4A-4C. The method of FIG. 8, generally designated 800, will be understood with reference to FIGS. 4A-4C and the above description thereof. Specifically, the exemplary method of FIG. 8 comprises the following steps:

In a first configuration with first firmware, a first system parameter stored in a hardware scratchpad and having a dynamic value is used (step 810).

In an intermediate configuration, the first system parameter is used with a fixed value (step 820).

In a second configuration with second firmware, the first system parameter is (again) used with a dynamic value (step 830).

A further consideration regarding the first firmware 112 and the second firmware 140, which may be applicable in any of FIGS. 1A-3C, is as follows. Some operations (initialization operations) within the first firmware 112 and/or the second firmware 140 may be intended to take place only at system-wide reset and not during an in-service firmware update, while other operations might be intended to take place whenever firmware begins to run. Since, without in-service firmware update, system-side reset would normally take place together with (before) firmware begins to run, special considerations apply in the case of in-service firmware update: initialization operations within the first firmware 112 and the second firmware 140 are marked as, or separated into, two classes, of which one class is to take place only at system reset, and the other class is to take place both at system reset and when the first firmware 112 and/or the second firmware 140 begins to run.

Further to the above, it is understood that operations which should only take place at system reset include, by way of non-limiting example, clearing/resetting all memory, which is a normal operation at reset but which would impede or prevent proper system operation during in-service firmware update.

Figure 9:
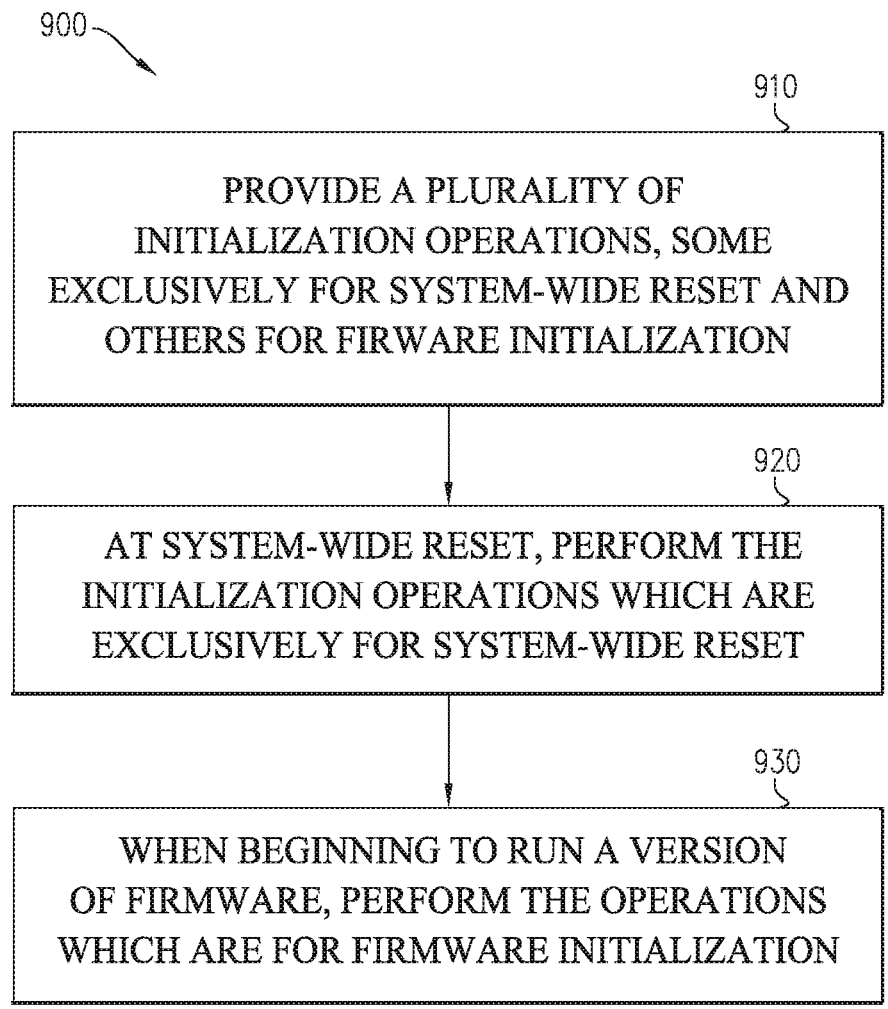

Reference is now additionally made to FIG. 9, which is a simplified flowchart illustration of a preferred method of operation of the system of FIGS. 1A-3C. The method of FIG. 9, generally designated 900, will be understood with reference to the discussion of reset above. Specifically, the exemplary method of FIG. 9 comprises the following steps:

A plurality of initialization operations is provided, some exclusively for system-wide reset and others for firmware initialization (step 910); in certain exemplary embodiments, at least some of those operations which are for firmware initialization may also be applicable to system-wide reset.

At system-wide reset, initialization operations which are exclusively for system-wide reset are performed (step 920).

When beginning to run (initializing) a version of firmware, the operations which are for firmware initialization are performed (step 930).

It is further appreciated that, in general, it may be desirable to design the first firmware 112 and the second firmware 140 in such a way that in-service update, in either direction, will run smoothly. For example, if the first firmware 112 changes a particular value in the scratchpad 110 but that value change is found to be unnecessary or undesirable, the second firmware 140 may contain what is in effect a null instruction which still references the memory location which holds the particular value but does not change the value; this may facilitate in-service firmware update in both directions between the first firmware 112 and the second firmware 140.

A further consideration regarding the first firmware 112 and the second firmware 140 might be present in case, when running with the first firmware 112, the one or more computer systems 102 make use of a table (such as, by way of non-limiting example, a hash table) in which "old" entries inserted when the first firmware 112 is running may not be of interest when the second firmware 140 is running, and may thus needlessly use memory space. Two non-limiting examples of addressing this situation are:

1. To clear out the hash table before running the second firmware 140; this may be helpful in a case where it is known that no "old" hash table entries are useful.

2. To mark existing hash table entries before running the second firmware 140; this may be helpful in a case where the "old" hash table entries may still be useful until new entries corresponding to the "old" entries are entered, and the "old" hash table entries may gradually be removed from a hash table in which they are comprised as those corresponding new entries are added.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A system composing:
    a processor;
    a firmware storage; and
    an on-system hardware scratchpad,
    the processor being adapted to alter a configuration of the system from a first configuration in which the firmware storage stores a first version of firmware run by the processor, into a second configuration in which the firmware storage stores a second version of firmware run by the processor, the first version of the firmware enabling the system to perform a first plurality of operations and the second version of the firmware enabling the system to perform a second plurality of operations, the first plurality of operations and the second plurality of operations not being identical, the altering of the configuration of the system comprising:
    A) re-configuring the system from the first configuration into an intermediate configuration in which the processor continues to run the first version of the firmware;

B) while the system is in the intermediate configuration, disallowing at least one operation of the first plurality of operations to run;
C) re-configuring the system from the intermediate configuration into the second configuration; and
D) while the system is in the second configuration, allowing the second plurality of operations to run, wherein:
while the system is in the first configuration, the system has a first set of states;
while the system is in the second configuration, the system has a second set of states, the first set of states and the second set of states not being identical;
while the system is in the intermediate configuration, the system has an intermediate set of states, the intermediate set of states comprising a subset of the first set of states and a subset of the second set of states;
the disallowing at least one operation of the first plurality of operations to run while the system is in the intermediate configuration comprises disallowing system transitions between any one state of the intermediate set of states and any other state of the intermediate set of states; and
the allowing the second plurality of operations to run while the system is in the second configuration comprises allowing system transitions between at least a first state of the second set of states and at least a second state of the second set of states.

2. The system according to claim 1 and wherein at least one operation of the first plurality of operations comprises an operation that is run at system reset and is not run while the system is in the intermediate configuration or in the second configuration.

3. The system according to claim 1 and wherein at least one operation of the second plurality of operations comprises an operation that is run at system reset and is not run while the system is in the second configuration.

4. The system according to claim 1 and wherein the processor is also adapted to load the second version of the firmware into the firmware storage.

5. The system according to claim 4 and wherein the re-configuring the system from the intermediate configuration into the second configuration comprises activating the second version of the firmware for running by the processor.

6. The system according to claim 5 and wherein:
the first configuration is associated with the first version of the firmware which is stored in the firmware storage and is in an active state when the system is in the first configuration; and
the second configuration is associated with the second version of the firmware which is stored in the firmware storage and is in an active state when the system is in the second configuration.

7. The system according to claim 1 and wherein the first version of the firmware and the second version of the firmware are simultaneously stored in the firmware storage, and the re-configuring the system from the intermediate configuration into the second configuration comprises ceasing to run the first version of the firmware and activating the second version of the firmware for running by the processor.

8. The system according to claim 1 and wherein the on-system hardware scratchpad stores at least one parameter used by the processor.

9. The system according to claim 1 and wherein A) also comprises quiescing the system from the first configuration to the intermediate configuration, the quiescing the system from the first configuration to the intermediate configuration comprising disallowing system transitions from any state comprised in the intermediate set of states to any state not comprised in the intermediate set of states.

10. The system according to claim 9 and wherein the quiescing the system from the first configuration to the intermediate configuration also comprises forcing the system from a state not comprised in the intermediate set of states to a state comprised in the intermediate set of states.

11. The system according to claim 10 and wherein:
while the system is in the first configuration, the system uses a first set of address locations in the on-system hardware scratchpad;
while the system is in the second configuration, the system uses a second set of address locations in the on-system hardware scratchpad;
in at least one of the intermediate configuration and the second configuration, the system transitions data from the first set of address locations in the on-system hardware scratchpad to the second set of address locations in the on-system hardware scratchpad; and
upon completing transitioning data from the first set of address locations in the on-system hardware scratchpad to the second set of address locations in the on-system hardware scratchpad, the system continues to operate in the second configuration.

12. The system according to claim 1 and wherein:
while the system is in the first configuration, the processor operates with a first system parameter stored in the on-system hardware scratchpad, the first system parameter having a value determined dynamically by the processor in accordance with the first version of the firmware;
while the system is in the intermediate configuration, the processor operates with the first system parameter having a static value; and
while the system is in the second configuration, the processor operates with the first system parameter having a value determined dynamically by the processor in accordance with the second version of the firmware.

13. The system according to claim 12 and wherein the first system parameter comprises fan speed.

14. A method composing:
altering a configuration of a system comprising a processor, a firmware storage, and an on-system hardware scratchpad from a first configuration in which the firmware storage stores a first version of firmware run by the processor, into a second configuration in which the firmware storage stores a second version of firmware run by the processor, the first version of the firmware enabling the system to perform a first plurality of operations and the second version of the firmware enabling the system to perform a second plurality of operations, the first plurality of operations and the second plurality of operations not being identical, the altering of the configuration of the system comprising:
A) re-configuring the system from the first configuration into an intermediate configuration in which the processor continues to run the first version of the firmware;
B) while the system is in the intermediate configuration, disallowing at least one operation of the first plurality of operations to run;
C) re-configuring the system from the intermediate configuration into the second configuration; and
D) while the system is in the second configuration, allowing the second plurality of operations to run, wherein:

while the system is in the first configuration, the system has a first set of states;

while the system is in the second configuration, the system has a second set of states, the first set of states and the second set of states not being identical;

while the system is in the intermediate configuration, the system has an intermediate set of states, the intermediate set of states comprising a subset of the first set of states and a subset of the second set of states;

the disallowing at least one operation of the first plurality of operations to run while the system is in the intermediate configuration comprises disallowing system transitions between any one state of the intermediate set of states and any other state of the intermediate set of states; and the allowing the second plurality of operations to run while the system is in the second configuration comprises allowing system transitions between at least a first state of the second set of states and at least a second state of the second set of states.

15. The method according to claim 14 and wherein A) also comprises quiescing the system from the first configuration to the intermediate configuration, the quiescing the system from the first configuration to the intermediate configuration comprising disallowing system transitions from any state comprised in the intermediate set of states to any state not comprised in the intermediate set of states.

16. The method according to claim 15 and wherein the quiescing the system from the first configuration to the intermediate configuration also comprises forcing the system from a state not comprised in the intermediate set of states to a state comprised in the intermediate set of states.

17. The method according to claim 14 and wherein:
while the system is in the first configuration, the system uses a first set of address locations in the on-system hardware scratchpad;

while the system is in the second configuration, the system uses a second set of address locations in the on-system hardware scratchpad;

in at least one of the intermediate configuration and the second configuration, the system transitions data from the first set of address locations in the on-system hardware scratchpad to the second set of address locations in the on-system hardware scratchpad; and upon completing transitioning data from the first set of address locations in the on-system hardware scratchpad to the second set of address locations in the on-system hardware scratchpad, the system continues to operate in the second configuration.

18. The method according to claim 14 and wherein:
while the system is in the first configuration, the processor operates with a first system parameter stored in the on-system hardware scratchpad, the first system parameter having a value determined dynamically by the processor in accordance with the first version of the firmware;

while the system is in the intermediate configuration, the processor operates with the first system parameter having a static value; and while the system is in the second configuration, the processor operates with the first system parameter having a value determined dynamically by the processor in accordance with the second version of the firmware.

* * * * *